(12) United States Patent
Deshmukh et al.

(10) Patent No.: US 12,550,107 B2
(45) Date of Patent: Feb. 10, 2026

(54) METHOD AND SYSTEM FOR PARALLELLY PROCESSING DATA

(71) Applicant: SAMSUNG ELECTRONICS CO., LTD., Suwon-si (KR)

(72) Inventors: Aneesh Deshmukh, Karnataka (IN); Nayan Ostwal, Karnataka (IN); Neha Sharma, Karnataka (IN); Anshuman Nigam, Karnataka (IN); Jitender Singh Shekhawat, Karnataka (IN); Byounghoon Jung, Suwon-si (KR); Chitradeep Majumdar, Karnataka (IN); Jiyoung Cha, Suwon-si (KR); Jungsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 530 days.

(21) Appl. No.: 17/982,888

(22) Filed: Nov. 8, 2022

(65) Prior Publication Data

US 2023/0059650 A1    Feb. 23, 2023

Related U.S. Application Data

(63) Continuation of application No. PCT/KR2021/005466, filed on Apr. 29, 2021.

(30) Foreign Application Priority Data

May 8, 2020 (IN) .............................. 202041019606
Mar. 30, 2021 (IN) .............................. 202041019606

(51) Int. Cl.
*H04W 64/00* (2009.01)
*H04W 68/00* (2009.01)

(52) U.S. Cl.
CPC ....... *H04W 64/003* (2013.01); *H04W 68/005* (2013.01)

(58) Field of Classification Search
CPC ... H04W 64/003; H04W 68/005; H04W 8/24; H04W 80/02; H04W 76/20; H04W 76/15;
(Continued)

(56) References Cited

U.S. PATENT DOCUMENTS

2010/0329135 A1    12/2010 Pelletier et al.
2014/0153520 A1    6/2014 Shinohara et al.
(Continued)

FOREIGN PATENT DOCUMENTS

BR    112019019369 A2 *   4/2020   ............ H04W 76/15
JP    2019524003 A *   8/2019   .............. H04W 4/00
(Continued)

OTHER PUBLICATIONS

Z. Gao, L. Huang and R. Zhang, "LTE user plane data transmission design based on layout optimization," 2015 IEEE 9th International Conference on Anti-counterfeiting, Security, and Identification (ASID), Xiamen, China, 2015, pp. 51-55, doi: 10.1109/ICASID.2015.7405660. (Year: 2015).*
(Continued)

*Primary Examiner* — Ayaz R Sheikh
*Assistant Examiner* — Louis Samara
(74) *Attorney, Agent, or Firm* — NIXON & VANDERHYE P.C.

(57) ABSTRACT

A network entity of a wireless network, comprises communication circuitry and at least one processor. The at least one processor is configured to receive capability information of a user equipment (UE) from the UE through the communication circuitry, to determine a number of parallel data processing supported by the UE based on the capability information of the UE, and to divide at least one of a data
(Continued)

link layer and a physical layer of the network entity based on the number of parallel data processing supported by the UE for the data processing.

16 Claims, 18 Drawing Sheets

(58) Field of Classification Search
CPC . H04W 72/542; H04W 76/27; H04W 72/569; H04L 67/566; H04L 69/24
See application file for complete search history.

(56) References Cited

U.S. PATENT DOCUMENTS

| | | | |
|---|---|---|---|
| 2015/0312957 A1* | 10/2015 | Pelletier | H04W 76/27 |
| 2016/0021567 A1 | 1/2016 | Agiwal et al. | |
| 2017/0265190 A1* | 9/2017 | Marjelund | H04W 72/21 |
| 2017/0280353 A1 | 9/2017 | Chauhan et al. | |
| 2018/0191551 A1* | 7/2018 | Chun | H04L 67/12 |
| 2018/0206213 A1 | 7/2018 | Kim et al. | |
| 2019/0289669 A1* | 9/2019 | Takahashi | H04W 76/15 |
| 2019/0373672 A1 | 12/2019 | Kim | |
| 2021/0176661 A1 | 6/2021 | Kim | |
| 2021/0227409 A1* | 7/2021 | Siomina | H04W 72/542 |

FOREIGN PATENT DOCUMENTS

| | | | |
|---|---|---|---|
| WO | WO-2015012557 A1 * | 1/2015 | H04W 72/569 |
| WO | 2019/093784 | 5/2019 | |

OTHER PUBLICATIONS

Oppo, 'Discussion on PC5-RRC for unicast', R2-1903211, 3GPP TSG RAN WG2 Meeting #105bis Xi'an, China, Mar. 29, 2019, 9 pages.
International Search Report for PCT/KR2021/005466 dated Aug. 6, 2021, 2 pages.
Written Opinion of ISA for PCT/KR2021/005466 dated Aug. 6, 2021, 4 pages.
Office Action for IN202041019606 dated Feb. 4, 2022, 7 pages.
Extended European Search Report dated Sep. 5, 2023 issued in European Patent Application No. 21799935.8.
Indian Notice of Hearing issued Sep. 23, 2024 in corresponding Indian Patent Application No. 202041019606.

* cited by examiner

FIG. 10

| MAC subheader 601 | 1st RLC PDU 602 | 2nd RLC PDU 603 | nth RLC PDU 604 |

FIG. 11

| R 701 | E 702 | LCID 703 |
|---|---|---|
| Subflow ID 704 |||
| Length of SubTB 705 |||
| Length of SubTB 706 |||
| Length of SubTB 707 |||

FIG. 12

| D 801 | P 802 | SI 803 | R 804 |
|---|---|---|---|
| SN 805 ||||
| SN 806 ||||
| Length 807 ||||
| Length 808 ||||

METHOD AND SYSTEM FOR PARALLELLY PROCESSING DATA

CROSS-REFERENCE TO RELATED APPLICATIONS

This application is a continuation of International Application No. PCT/KR2021/005466 designating the United States, filed on Apr. 29, 2021, in the Korean Intellectual Property Receiving Office and claiming priority to Indian Provisional Patent Application No. 202041019606, filed on May 8, 2020, in the Indian Patent Office, and to Indian Non-Provisional Patent Application No. 202041019606, filed on Mar. 30, 2021, in the Indian Patent Office, the disclosures of all of which are incorporated by reference herein in their entireties.

BACKGROUND

Field

The present disclosure relates to wireless communication, and for example, to a method and a system for parallelly processing data in a wireless network.

Description of Related Art

Existing Fifth Generation new radio (5G NR) wireless communication systems are capable of supporting a peak data rate (e.g., a throughput) of about 50 Gigabits per second (Gbps) with a peak data rate of 4 Gbps per user. With advancement in radio access technologies and exploring further higher bandwidths beyond 100 giga hertz (GHz), a requirement of the peak data rate in future wireless communication systems may go easily beyond 100 Gbps. A typical NR user equipment (UE) uses a quad-core system that supports 4 Gbps transmission control protocol (TCP) application on a modem protocol stack including data plane processing layers like packet data convergence protocol (PDCP) layer, a radio link control (RLC) layer, and a media access control (MAC) layer. Existing processor utilization analysis indicates that existing designs of the modem protocol stack are usually a bottleneck to further increase the throughput.

In order to increase the throughput at the UE, functional decomposition and data decomposition are proposed for the existing 5G NR wireless communication systems. In case of the functional decomposition, functions in a data commutation can be executed parallelly to increase the throughput. Each function should not depend on other functions to perform the functional decomposition, which is not a feasible technique. For example, a decomposition of the functions within the RLC layer can't be equally distributed among different tasks across multiple cores of a processor to make the functions truly and equally parallel with no critical section such as a window management, a segment reassembly, etc. in the RLC layer. In case of the data decomposition, data is divided into multiple segments and execute the multiple segments parallelly to increase the throughput. However, instances are there processing of one segment of the data depends on another segment of processed data. For example, the data decomposition of a single RLC flow causes lots of overhead in managing a common RLC window and handling RLC procedures. Thus, it is desired to provide a useful alternative for significantly improving the throughput in the 5G NR wireless communication systems.

SUMMARY

Embodiments of the disclosure provide a method and a system for improving throughput in wireless communication. The system divides data link layers and/or a physical layer of a network entity and a UE based on a number of parallel data processing supported by the UE. Further, data is processed through the divided set of data link layers and/or the physical layer parallelly and independently for significantly improving the throughput in the UE and the network entity.

Embodiments of the disclosure process the data in a batch and pack the processed data using a MAC sub-header for achieving an optimal parallelization and a high data rate.

Embodiments of the disclosure dynamically increase or decrease the divisions of the data link layers and/or the physical layer based on a capability information of the UE. Resources of the system such as a memory, an electric power, a bandwidth, processor cores, etc. can be efficiently utilized by dynamically increasing or decreasing the divisions of the data link layers and/or the physical layer.

Accordingly, various example embodiments herein provide a method for data processing in a wireless network. The method includes: receiving, by a network entity of the wireless network, a capability information of a user equipment (UE) from the UE; determining, by the network entity, a number of parallel data processing supported by the UE based on the capability information of the UE; and dividing, by the network entity, data link layers, and/or a physical layer of the network entity based on the number of parallel data processing supported by the UE for the data processing.

The example method may further include: sending, by the network entity, a configuration parameter including the number of parallel data processing supported by the UE to the UE; and dividing, by the UE, data link layers and/or a physical layer of the UE based on the number of parallel data processing supported by the UE.

In an example embodiment, the method includes: receiving, by the UE, a plurality of packet data units (PDUs); distributing, by the UE, the plurality of PDUs to the divided data link layers and/or the divided physical layer of the UE for parallelly processing the plurality of PDUs; sending, by the UE, the processed PDUs to the network entity; receiving, by the network entity, the processed PDUs; and parallelly aggregating, by the network entity, the processed PDUs using the data link layers, and the physical layer of the network entity for generating the plurality of PDUs.

In an example embodiment, the method includes: receiving, by the network entity, a plurality of packet data units (PDUs); distributing, by the network entity, the plurality of PDUs to the divided data link layers and the divided physical layer of the network entity for parallelly processing the plurality of PDUs; sending, by the network entity, the processed PDUs to the UE; receiving, by the UE, the processed PDUs; and parallelly aggregating, by the UE, the processed PDUs using the data link layers and the physical layer of the UE for generating the plurality of PDUs.

In an example embodiment, the capability information of the UE includes at least one of, but not limited to a number of cores of a processor of the UE available for data processing, a processor frequency, a maximum throughput of the UE, and a throughput requirement of an application of the UE.

In an example embodiment, the data link layers include a packet data convergence protocol (PDCP) layer, a radio link control (RLC) layer, and a media access control (MAC) layer.

In an example embodiment, the method includes dynamically updating, by the UE and the network entity, a number of divisions of the data link by maintaining at least one active data flow based on a throughput or a performance requirement.

Accordingly, various example embodiments herein provide a method for the data processing in the UE. The method includes: sending, by the UE, a capability information of the UE to the network entity of the wireless network; receiving, by the UE, the configuration parameter includes a number of parallel data processing supported by the UE from the network entity; and dividing, by the UE, the data link layers and/or the physical layer of the UE based on the number of parallel data processing supported by the UE.

Accordingly, various example embodiments herein provide a system for the data processing. The system includes: a network entity of the wireless network and the UE, the network entity configured to: receive the capability information of the UE from the UE; determine the number of parallel data processing supported by the UE based on the capability information of the UE; and divide the data link layers and/or the physical layer of the network entity based on the number of parallel data processing supported by the UE for the data processing.

Accordingly, various example embodiments herein provide a system for the data processing. The system includes: the network entity of the wireless network and the UE, the UE configured to: send the capability information of the UE to the network entity; receive the configuration parameter including the number of parallel data processing supported by the UE from the network entity; and divide the data link layers and/or the physical layer of the UE based on the number of parallel data processing supported by the UE.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

The disclosure is illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which:

FIG. 10 is a diagram illustrating an example frame format of a MAC sub-transmission block, according to various embodiments;

FIG. 11 is a diagram illustrating an example frame format of a MAC LCID sub-header with a sub-flow identifier, according to various embodiments; and FIG. 12 is a diagram illustrating an example frame format of a 16-bit RLC header with a sequence number, according to various embodiments.

DETAILED DESCRIPTION

Figure 1:
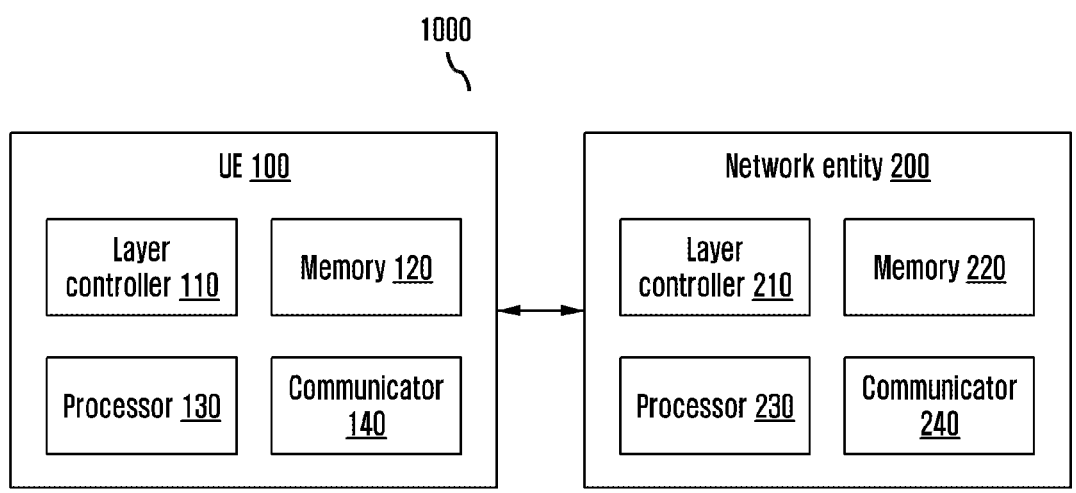
FIG. 1 is a block diagram illustrating an example configuration of a system for data processing in a wireless network, according to various embodiments.

The various example embodiments herein and the various features and advantageous details thereof are explained more fully with reference to the non-limiting example embodiments that are illustrated in the accompanying drawings and described in the following description. Descriptions of well-known components and processing techniques may be omitted so as to not unnecessarily obscure the embodiments herein. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for data processing in a wireless network. The method includes receiving, by a network entity of the wireless network, a capability information of a UE from the UE. The method includes determining, by the network entity, a number of parallel data processing supported by the UE based on the capability information of the UE. The method includes dividing, by the network entity, data link layers and/or a physical layer of the network entity based on the number of parallel data processing supported by the UE for the data processing.

Accordingly, the embodiments herein provide a method for the data processing in the UE. The method includes sending, by the UE, a capability information of the UE to the network entity of the wireless network. The method includes receiving, by the UE, the configuration parameter includes a number of parallel data processing supported by the UE from the network entity. The method includes dividing, by the UE, the data link layers and/or the physical layer of the UE based on the number of parallel data processing supported by the UE.

Accordingly, the embodiments herein provide a system for the data processing. The system includes the network entity of the wireless network and the UE. The network entity is configured to receive the capability information of the UE from the UE. The network entity is configured to determine the number of parallel data processing supported by the UE based on the capability information of the UE. The network entity is configured to divide the data link layers and/or the physical layer of the network entity based on the number of parallel data processing supported by the UE for the data processing.

Accordingly, the embodiments herein provide the system for the data processing. The system includes the network entity of the wireless network and the UE. The UE is configured to send the capability information of the UE to the network entity. The UE is configured to receive the configuration parameter includes the number of parallel data processing supported by the UE from the network entity. The UE is configured to divide the data link layers and/or the physical layer of the UE based on the number of parallel data processing supported by the UE.

Unlike existing methods and systems, the network entity and the UE can divide the data link layers and/or the physical layer based on the number of parallel data processing supported by the UE. Further, data is processed through the divided set of data link layers and/or the physical layer parallelly and independently for no critical section, which significantly improves a data rate between the network entity and the UE. Segmentation of a single internet protocol (IP) flow to multiple streams at radio access network (RAN) level enhances a parallelization feature by introducing a concept of sub-flows.

Unlike existing methods and systems, the network entity and the UE process the data in a batch and pack the processed data using a MAC sub-header for achieving an optimal parallelization and a high data rate.

Unlike existing methods and systems, the network entity and the UE can dynamically increase or decrease the divisions of the data link layers and/or the physical layer based on the capability information of the UE. Resources of the network entity and the UE such as a memory, an electric power, a bandwidth, processor cores etc. can be efficiently utilized by dynamically increasing or decreasing the divisions of the data link layers and/or the physical layer.

Referring now to the drawings, and more particularly to FIGS. 1 through 12, there are shown various example embodiments.

FIG. 1 is a block diagram illustrating an example configuration of a system (1000) for data processing in a wireless network, according to various embodiments. An examples of the wireless network includes, but not just limited to a cellular network such as $4^{th}$ Generation (4G) mobile communication network, $5^{th}$ Generation (5G) mobile communication network, $6^{th}$ Generation (6G) mobile communication network, etc. In an embodiment, the system (1000) includes a UE (100) and a network entity (e.g., including various circuitry) (200) of the wireless network, where the UE (100) is connected to the network entity (200).

Examples of the UE (100) includes, but not limited to a smart phone, a tablet computer, a personal digital assistance (PDA), a desktop computer, an internet of things (IoT), a wearable device, etc. In an embodiment, the UE (100) includes a layer controller (e.g., including various processing circuitry and/or executable program instructions) (110), a memory (120), a processor (e.g., including processing circuitry) (130), and a communicator (e.g., including communication circuitry) (140), where the layer controller (110) is coupled to the memory (120) and the processor (130). The layer controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The memory (120) stores PDUs (410). The memory (120) may include non-volatile storage elements. Examples of such non-volatile storage elements may include magnetic hard discs, optical discs, floppy discs, flash memories, or forms of an electrically programmable memory (EPROM) or an electrically erasable and programmable memory (EEPROM). In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than the memory (120) respectively. In certain examples, a non-transitory storage medium may store data that can, over time, change (e.g., in random access memory (RAM) or cache).

The processor (130) may include various processing circuitry and is configured to execute instructions stored in the memory (120). The processor (130) may be a general-purpose processor, such as a central processing unit (CPU), an application processor (AP), or the like, a graphics-only processing unit such as a graphics processing unit (GPU), a visual processing unit (VPU) and the like. The processor (130) may include multiple cores to execute the instructions. The communicator (140) is configured to communicate internally between hardware components in the UE (100). Further, the communicator (140) is configured to facilitate the communication of the UE (100) with the network entity (200). The communicator (140) includes an electronic circuit specific to a standard that enables wired or wireless communication.

An example of the network entity (200) includes, but not just limited to a base station. In an embodiment, the network entity (200) includes a layer controller (e.g., including various processing circuitry and/or executable program instructions) (210), a memory (220), a processor (e.g., including processing circuitry) (230), and a communicator (e.g., including communication circuitry) (240), where the layer controller (210) is coupled to the memory (220) and the processor (230). The layer controller (210) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The memory (220) stores the PDUs (410). The memory (220) stores the displacement threshold and the magnetic field threshold. The memory (220) may include non-volatile storage elements. Examples of such non-volatile storage elements may include magnetic hard discs, optical discs, floppy discs, flash memories, or forms of an electrically programmable memory (EPROM) or an electrically erasable and programmable memory (EEPROM). In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information than the memory (220) respectively. In certain examples, a non-transitory storage medium may store data that can, over time, change (e.g., in random access memory (RAM) or cache).

The processor (230) may include various processing circuitry and is configured to execute instructions stored in the memory (220). The processor (230) may be a general-purpose processor, such as a central processing unit (CPU), an application processor (AP), or the like, a graphics-only processing unit such as a graphics processing unit (GPU), a visual processing Unit (VPU) and the like. The processor (230) may include multiple cores to execute the instructions. The communicator (240) is configured to communicate internally between hardware components in the network entity (200). Further, the communicator (240) is configured to facilitate the communication of the network entity (200) with the UE (100) and other devices. The communicator (240) includes an electronic circuit specific to a standard that enables wired or wireless communication.

The UE (100) is configured to send a capability information of the UE (100) to the network entity (200). In an embodiment, the capability information of the UE (100) includes at least one of, but not limited to a number of cores of the processor (130) of the UE (100) available for data processing, a processor frequency, a maximum throughput of the UE (100), and a throughput requirement of an application of the UE (100). In an embodiment, the layer controller (110) sends the capability information of the UE (100) to the network entity (200).

The network entity (200) is configured to receive the capability information of the UE (100) from the UE (100). In an embodiment, the layer controller (210) receives the capability information of the UE (100) from the UE (100). The network entity (200) is configured to determine a number of parallel data processing supported by the UE (100) based on the capability information of the UE (100). In an embodiment, the layer controller (210) determines the number of parallel data processing supported by the UE (100) based on the capability information of the UE (100). The network entity (200) is configured to divide data link layers and/or a physical layer of the network entity (200) based on the number of parallel data processing supported by the UE (100) for the data processing. In an embodiment, the data link layers include a PDCP layer (420, 540), a RLC layer (430, 530), and a MAC layer (440, 520). The terms 'PDCP layer' and 'PDCP' are interchangeably used in this disclosure. The terms 'RLC layer' and 'RLC' are interchangeably used in this disclosure. The terms 'MAC layer' and 'MAC are interchangeably used in this disclosure. The terms 'physical layer' and 'PHY are interchangeably used in this disclosure.

In an embodiment, the layer controller (210) divides the data link layers and/or the physical layer of the network entity (200) based on the number of parallel data processing supported by the UE (100) for the data processing.

The network entity (200) is configured to send a configuration parameter that includes the number of parallel data processing supported by the UE (100) to the UE (100). In an embodiment, the layer controller (210) sends the configuration parameter includes the number of parallel data processing supported by the UE (100) to the UE (100). The UE (100) is configured to receive the configuration parameter from the network entity (200). In an embodiment, the layer controller (110) receives the configuration parameter from the network entity (200). The UE (100) is configured to divide data link layers and/or a physical layer of the UE (100) based on the number of parallel data processing supported by the UE (100), in response to receiving the configuration parameter. In an embodiment, the layer controller (110) divides the data link layers and/or the physical layer of the UE (100) based on the number of parallel data processing supported by the UE (100), in response to receiving the configuration parameter.

In an embodiment, the layer controller (110) determines whether to turn ON/OFF the segmentation of the data link layers and/or the physical layer of the UE (100) based on the configuration parameter. In an embodiment, the layer controller (210) determines whether to turn ON/OFF the segmentation of the data link layers and/or the physical layer of the network entity (200) based on the configuration parameter. In an embodiment, the configuration parameter is a static configuration parameter when the number of segments of the data link layers and/or the physical layer is a constant value. The layer controller (210) allows a radio resource control (RRC) of the network entity (200) to send the static configuration parameter to the UE (100). In an embodiment, the configuration parameter is a dynamic configuration parameter when the number of segments of the data link layers and/or the physical layer is varying based on wireless channel conditions and the capability information of the UE (100). The layer controller (210) allows the MAC layer (520) of the network entity (200) to send the dynamic configuration parameter to the UE (100).

In an embodiment, the UE (100) is configured to receive the PDUs (410) and operates as a transmitting device. In an embodiment, the layer controller (110) receives the PDUs (410) from the memory (120) or an application of the UE (100). The UE (100) is configured to distribute the PDUs (410) to the divided data link layers and/or the divided physical layer of the UE (100) for parallelly processing the PDUs (410). In an embodiment, the layer controller (110) distributes the PDUs (410) to the divided data link layers and/or the divided physical layer of the UE (100). The UE (100) is configured to send the processed PDUs (e.g., service data units (SDUs)) to the network entity (200). In an embodiment, the layer controller (110) sends the processed PDUs to the network entity (200). The network entity (200) is configured to receive the processed PDUs and operates as a receiving device. In an embodiment, the layer controller (210) receives the processed PDUs. The network entity (200) is configured to parallelly aggregate the processed PDUs using the data link layers and/or the physical layer of the network entity (200) for generating the PDUs (410). In an embodiment, the layer controller (210) parallelly aggregates the processed PDUs using the data link layers and/or the physical layer of the network entity (200) for generating the PDUs (410).

In an embodiment, the network entity (200) is configured to receive the PDUs (410) and operates as the transmitting device. In an embodiment, the layer controller (210) receives the PDUs (410) from the memory (220) or an application of the network entity (200). The network entity (200) is configured to distribute the PDUs (410) to the divided data link layers and/or the divided physical layer of the network entity (200) for parallelly processing the PDUs (410). In an embodiment, the layer controller (210) distributes the PDUs (410) to the divided data link layers and/or the divided physical layer of the UE (100). The network entity (200) is configured to send the processed PDUs to the UE (100). In an embodiment, the layer controller (210) sends the processed PDUs to the UE (100). The UE (100) is configured to receive the processed PDUs and operates as the receiving device. In an embodiment, the layer controller (110) receives the processed PDUs. The UE (100) is configured to parallelly aggregate the processed PDUs using the data link layers and/or the physical layer of the UE (100) for generating the PDUs (410). In an embodiment, the layer controller (110) parallelly aggregates the processed PDUs using the data link layers and/or the physical layer of the UE (100) for generating the PDUs (410).

In an embodiment, the network entity (200) is configured to dynamically increase or decrease the divisions of the layers (e.g., the data link layers and/or the physical layer) based on the capability information of the UE (100). For example, consider the network entity (200) detects that the throughput requirement of the UE (100) is high, then the network entity (200) is configured to dynamically increase the divisions of the layers. When the network entity (200) detects that the throughput requirement of the UE (100) is low, then the network entity (200) is configured to dynamically decrease the divisions of the layers and keeping at least one data-flow active until the UE (100) remains active. In an embodiment, the network entity (200) provides an indication to the layer controller (210) and the layer controller (110) for increasing or decreasing the divisions of the layers through the RRC and/or the MAC layer.

Although FIG. 1 shows the hardware components of the system (1000) it is to be understood that various embodiments are not limited thereon. In various embodiments, the system (1000) may include less or more number of components. Further, the labels or names of the components are used only for illustrative purpose and does not limit the scope of the disclosure. One or more components can be combined together to perform same or substantially similar function for the data processing.

Figure 2:
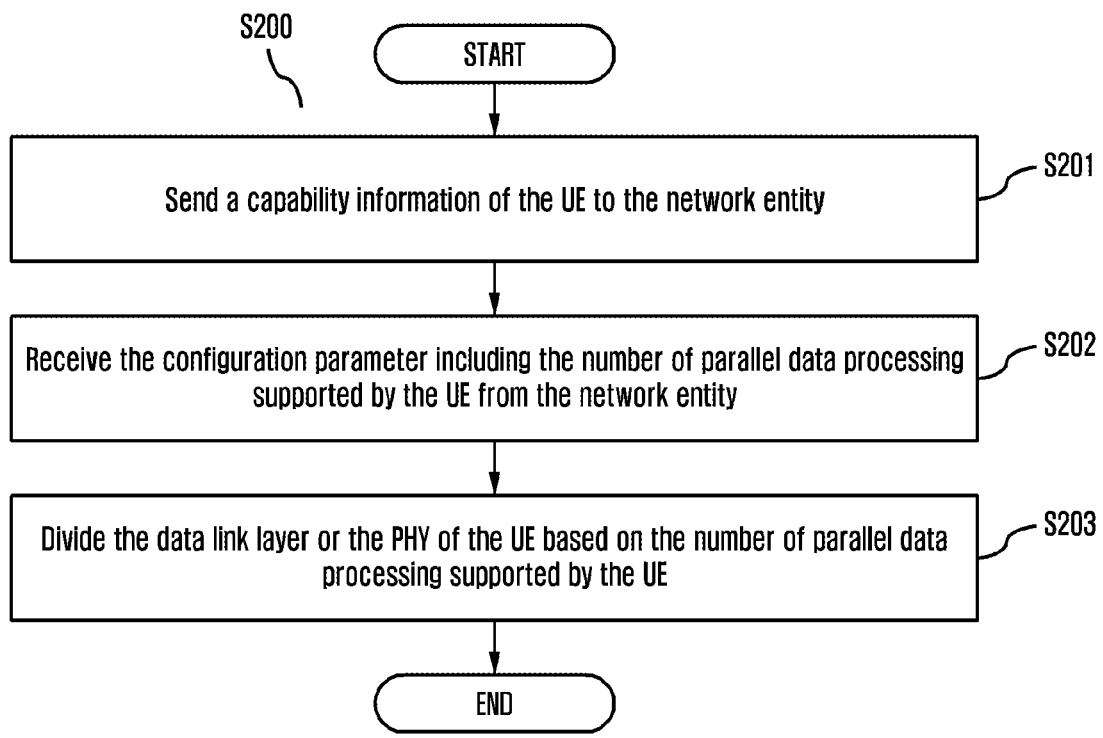
FIG. 2 is a flowchart illustrating an example method for data processing in a UE, according to various embodiments.

FIG. 2 is a flowchart S200 illustrating an example method for the data processing in the UE (100), according to various embodiments. At S201, the method includes sending the capability information of the UE (100) to the network entity (200). At S202, the method includes receiving the configuration parameter including the number of parallel data processing supported by the UE (100) from the network entity (200). At S203, the method includes dividing the data link layers or the physical layer of the UE based on the number of parallel data processing supported by the UE (100). In an embodiment, the method allows the layer controller (110) to perform the steps S201-S203.

The various actions, acts, blocks, steps, operations, or the like in the flow diagram S200 may be performed in the order presented, in a different order or simultaneously. Further, in various embodiments, some of the actions, acts, blocks, steps, or the like may be omitted, added, modified, skipped, or the like without departing from the scope of the disclosure.

Figure 3:
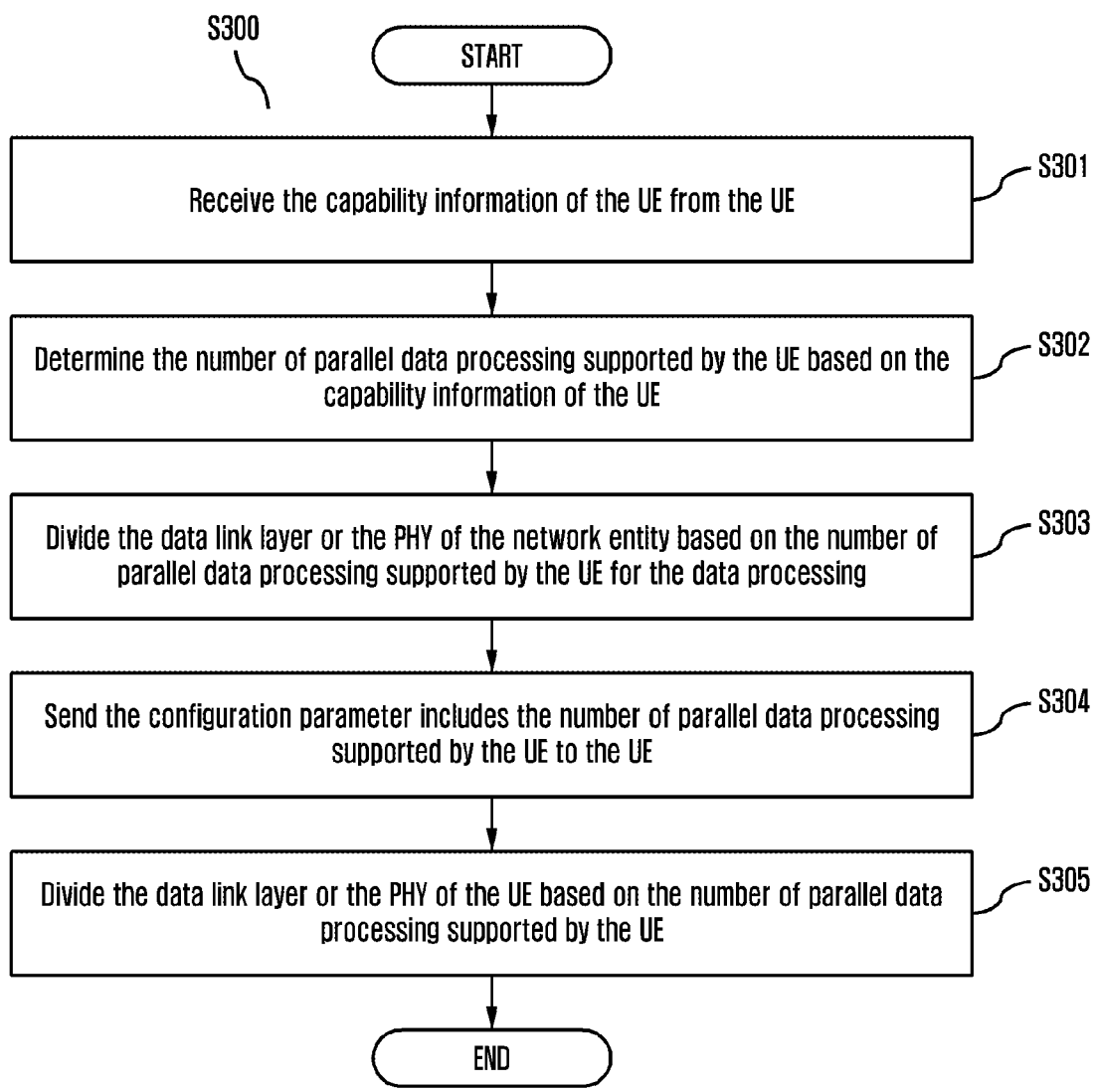
FIG. 3 is a flowchart illustrating an example method for data processing in a network entity, according to various embodiments.

FIG. 3 is a flowchart S300 illustrating an example method for the data processing in the network entity (200), according to various embodiments. At S301, the method includes receiving the capability information of the UE (100) from the UE (100). At S302, the method includes determining the number of parallel data processing supported by the UE (100) based on the capability information of the UE (100). At S303, the method includes dividing the data link layers or the physical layer of the network entity (200) based on the number of parallel data processing supported by the UE (100) for the data processing. At S304, the method includes sending the configuration parameter includes the number of parallel data processing supported by the UE (100) to the UE (100). At S305, the method includes dividing the data link layers or the physical layer of the UE (100) based on the number of parallel data processing supported by the UE (100). In an embodiment, the method allows the layer controller (210) to perform the steps S301-S305.

The various actions, acts, blocks, steps, operations, or the like in the flow diagram S300 may be performed in the order presented, in a different order or simultaneously. Further, in various embodiments, some of the actions, acts, blocks, steps, or the like may be omitted, added, modified, skipped, or the like without departing from the scope of the disclosure.

Figure 4A:
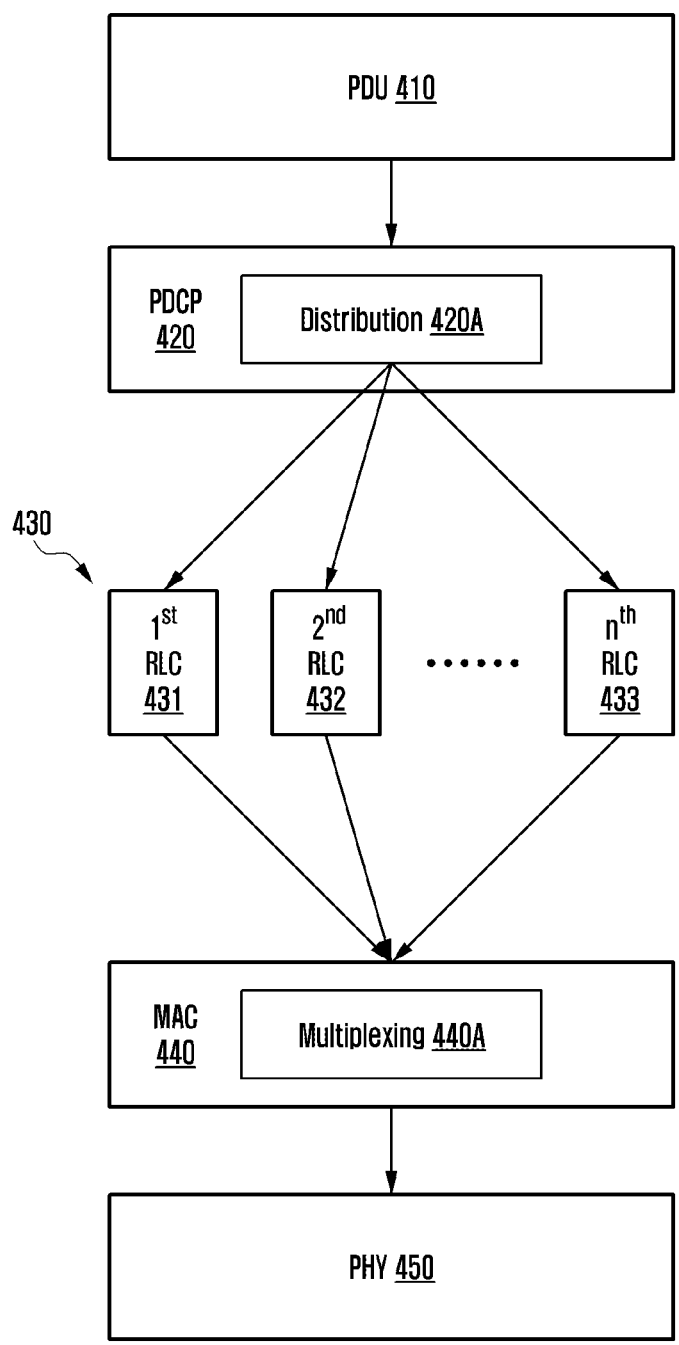
FIG. 4A is a diagram illustrating example data processing in a transmitting device by dividing a RLC layer, according to various embodiments.

FIG. 4A is a diagram illustrating example data processing in a transmitting device by dividing the RLC layer (430), according to various embodiments. Consider an example scenario where the UE (100) needs to send the PDUs (410) to the network entity (200). The UE (100) is the transmitting device, and the network entity (200) is the receiving device in the example scenario. The transmitting device includes the PDCP layer (420), the RLC layer (430), the MAC layer (440), and the physical layer (450). The layer controller (110) divides the RLC layer (430) into multiple RLC layers e.g., $1^{st}$ RLC (431) to $n^{th}$ RLC (433), where n=2, 3, etc. The layer controller (110) provides the PDUs (410) to the PDCP layer (420) of the transmitting device by mapping a transport layer flow to one radio flow at the PDCP layer (420).

In response to processing the PDUs (410) at the PDCP layer (420), the layer controller (110) distributes (420A) the PDUs (410) from the PDCP layer (420) to the multiple RLC layers (431, 432, 433 which may be referred to as 431-433) for parallelly and independently processing the PDUs (410) at the multiple RLC layers (431-433). In an embodiment, the PDUs (410) are distributed based on at least one of a sequence (e.g. round robin manner), a random method, a batch/block method, a load (e.g. buffer occupancy) on each RLC layer (431-433), a processing capability (e.g. maximum idle time) of the each RLC layer (431-433), and a heuristic based method. In the random method, the PDCP layer (420) sends the PDU (410) to each RLC layer (431-433) in a random sequence. In the batch/block method, the PDCP layer (420) sends a batch/block of sequential PDUs to each RLC layer (431-433), which implies that a set of consecutive packets would be handled and processed in bulk in a sub-flow.

In the batch/block method, consecutive PDUs (410) from the PDCP layer (420) are processed by the RLC layers (431-433) ensures that during a delivery of the processed PDUs from RLC layers (531, 532, 533 which may be referred to as 531-533 (refer to FIG. 4B)) of the receiving device to a PDCP layer (540) of the receiving device will be in the same order coming from each RLC layer (431-433).

In an embodiment, the batch/block of sequential PDUs may distributed to the multiple RLC layers (431-433) based on example conditions given below.

If "P" number of the PDUs (410) are received in over "T" time instant and the RLC layer (430) is divided into "N" RLC layers (431-433), then each RLC layers (431-433) can receive a P divided by N number of consecutive PDUs. For example, for a 100 Gbps IP flow with a packet size of 1500 bytes, a total number of packets getting received by the PDCP layer (540) at every 1 ms are ~8300 packets. If 25 RLC layers (431-433) are configured at the transmitting device, each RLC layer (431-433) receives the batch of ~332 in-sequence PDUs at every 1 ms to process.

The batch of the consecutive PDUs should be equal to the available buffer at each RLC layer (431-433).

A size limit of batch of the consecutive PDUs should be a configurable parameter based upon a type of service and a RLC sub-flow processing capability.

In the heuristic based method, the PDCP layer (420) sends the PDU (410) to each RLC layer (431-433) based on an additional information like a number of retransmissions needed for successful delivery of the PDUs (410), etc. In response to processing the PDUs (410), the multiple RLC layers sends the processed PDUs to the MAC layer (440) of the transmitting device. The processed PDUs from each RLC layer (431-433) includes a header indicates the RLC layers (431-433) from which the PDUs (410) is processed. The MAC layer (440) multiplexes (440A) the processed PDUs into a single Transport Block (TB). Further, the MAC layer (440) sends the single TB to the receiving device through the physical layer (450) of the transmitting device.

In an embodiment, the transmitting device receives the processed PDUs from each RLC layer (431-433) and concatenates the processed PDUs into the TB based on a grant received from the physical layer (450).

In an embodiment, the MAC layer (440) assigns a sub-flow ID in a MAC sub-header for the processed PDU from the multiple RLC layers (431-433).

In an embodiment, the MAC layer (440) performs concatenation (e.g., multiplexing) sequentially by selecting the processed PDUs from the multiple RLC layers (431-433) one after another.

In an embodiment, the MAC layer (440) performs concatenation (e.g., multiplexing) randomly by selecting the processed PDUs from the multiple RLC layers (431-433) that are available to be packed into the TB of the MAC layer (440).

In an embodiment, the MAC layer (440) performs concatenation (e.g., multiplexing) in a batch to ensure that the processed PDUs from the multiple RLC layers (431-433) of same sub-flow is concatenated continuously into the TB of the MAC layer (440).

In an embodiment, the MAC layer (440) performs concatenation (e.g., multiplexing) based on a throughput from the multiple RLC layers (431-433) and a priority of a processed PDU over another processed PDU for packing to the TB.

In an embodiment, for a single carrier each logical channel at the MAC layer (440) can have a same Logical Channel Prioritization (LCP) or different LCP for each RLC layer (431-433), where the single MAC layer (440) can support single/multiple carriers as well. The logical channel is an abstract way of classifying or grouping various types of data which is sent over a wireless channel. The MAC layer (440) can pack the processed PDUs to the TB on the multiple carriers parallelly.

In an embodiment, the MAC TB packaging is beneficial if the processed PDUs from the multiple RLC layers (431-433) are contiguous as well as when segmentation is minimal. When RLC PDUs within a single MAC TB are of contiguous nature, there is an easy way of packaging them in terms of fast processing. As well as, when the receiving device receives this MAC TB, since all the RLC PDUs are contiguous, there is no reordering of received packets and can be delivered quickly to upper layers.

When the network entity (200) needs to send the PDU (410) to the UE (100), then the UE (100) will be the receiving device, and the network entity (200) will be the transmitting device.

Figure 4B:
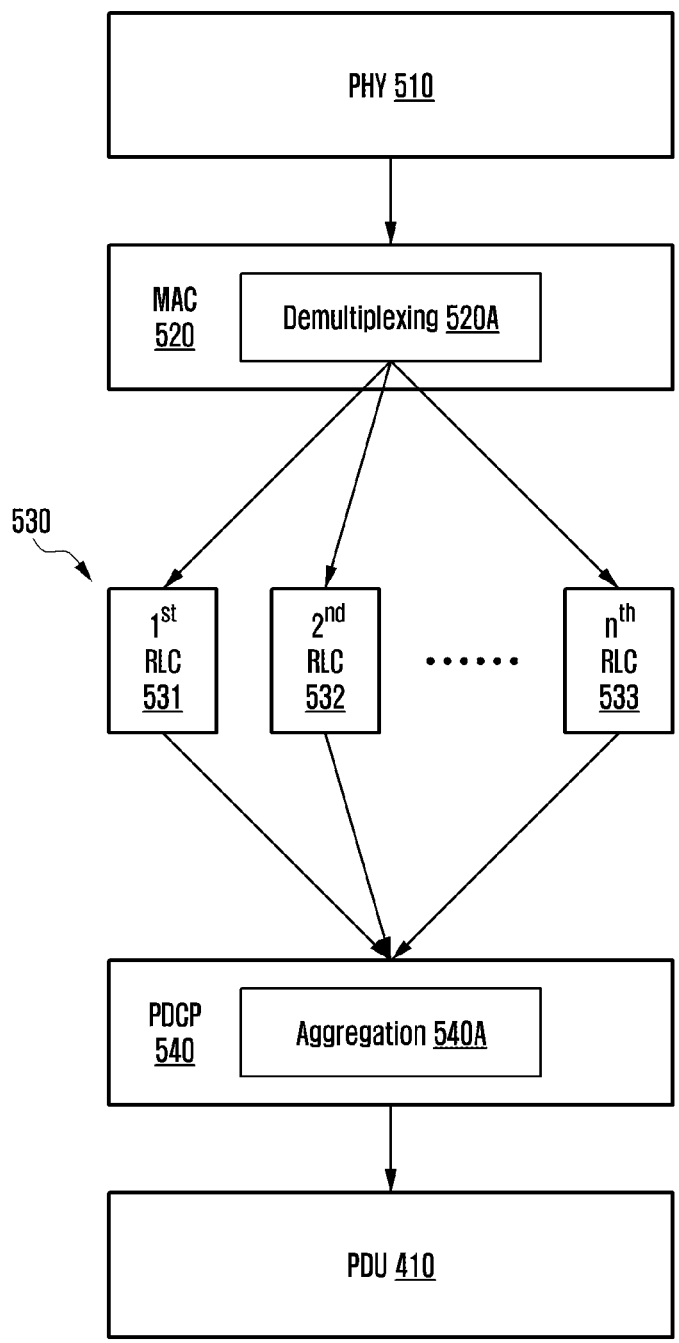
FIG. 4B is a diagram illustrating example data processing in a receiving device by dividing a RLC layer, according to various embodiments.

FIG. 4B is a diagram illustrating example data processing in the receiving device by dividing the RLC layer (530), according to an embodiment as disclosed herein. Consider the example scenario where the UE (100) is the transmitting device, and the network entity (200) is the receiving device. The receiving device includes the PDCP layer (540), the RLC layer (530), the MAC layer (520), and the physical layer (510). The layer controller (210) divides the RLC layer (530) into multiple RLC layers e.g., $1^{st}$ RLC (531) to $n^{th}$ RLC (533), where n=2, 3, etc.

The MAC layer (520) receives the TB from the transmitting device through the physical layer (510) of the receiving device. Further, the MAC layer (520) demultiplexes (520A) the TB to the processed PDUs according to the MAC sub-header in each processed PDU. In response to obtaining the processed PDUs, the layer controller (210) distributes the processed PDUs from the MAC layer (520) to corresponding RLC layers (531-533) by parsing the MAC sub-headers of each processed PDU. When the TB is received at the receiving device through multiple carriers, the MAC layer (520) parses the TB from the multiple carriers in parallel.

Each RLC layer (531-533) processes the PDUs received from the MAC layer (520) independently and delivers packets to the PDCP layer (540). In response to receiving the processed PDUs at the PDCP layer (540), the layer controller (210) parallelly aggregates (540A) the processed PDUs for generating the PDUs (410). The layer controller (210) parallelly aggregates (540A) the processed PDUs in the same order at which the PDUs (410) are processed at the PDCP layer (420) of the transmitting device.

In an embodiment, the PDCP layer (420) distributes the processed PDUs to the RLC layers (431-433) in batches to have less impact on aggregation at the PDCP layer (540). Therefore, the RLC layers (531-533) can further put a constraint to deliver the processed PDUs to the PDCP layer (540) only in an order. The layer controller (210) reorders the processed PDUs only in a batch level at the PDCP layer (540). Since the packets received within the batch are all ordered by a virtue of how those were packed in the transmitting device, when the PDCP layer receives those batches, the PDCP layer need not worry about the PDCP PDUs within that batch. The RLC layers (531-533) includes a configurable parameter for delivering the processed PDUs from the RLC layers (531-533) to the PDCP layer (540) in-order or out-of-order. The layer controller (210) parses a PDCP header in the processed PDUs received from the RLC layers (531-533), where the PDCP header is a cumbersome. The parsing can be implemented in parallel at cores of the processor of the receiving device to fasten up the aggregation operation.

Figure 5A:
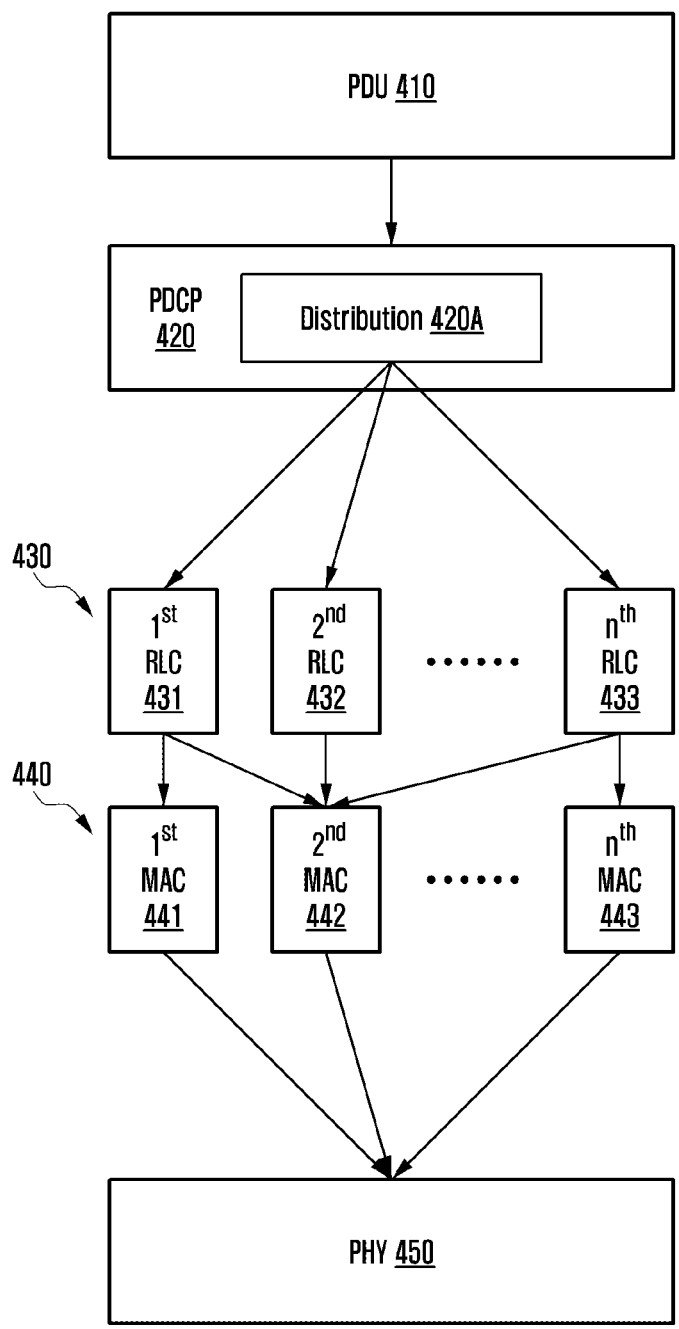
FIG. 5A is a diagram illustrating example data processing in the transmitting device by dividing the RLC layer and a MAC layer, according to various embodiments.

FIG. 5A is a diagram illustrating example data processing in the transmitting device by dividing the RLC layer (431) and the MAC layer (440), according to various embodiments. Consider the example scenario where the UE (100) needs to send the PDUs (410) to the network entity (200). Then the UE (100) is the transmitting device, and the network entity (200) is the receiving device in the example scenario. The layer controller (110) divides the RLC layer (430) into the multiple RLC layers e.g., $1^{st}$ RLC (431) to $n^{th}$ RLC (433), where n=2, 3, etc. Further, the layer controller (110) divides the MAC layer (440) into multiple MAC layers e.g., $1^{st}$ MAC (441) to $n^{th}$ RLC (433), where n=2, 3, etc.

In response to receiving and processing the PDUs (410) at the PDCP layer (420), the layer controller (110) distributes (420A) the PDUs (410) from the PDCP layer (420) to the multiple RLC layers (431-433) for parallelly and independently processing the PDUs (410) at the multiple RLC layers (431-433). In an embodiment, the PDUs (410) are distributed based on at least one of the sequence (e.g. round robin manner), the random method, the batch/block method, the load (e.g. buffer occupancy) on each RLC layer (431-433), the processing capability (e.g. maximum idle time) of the each RLC layer (431-433), and the heuristic based method.

In response to processing the PDUs (410), each RLC layer (431-433) sends the processed PDUs to the MAC layer (441, 442, 433 which may be referred to as 441-443) of the transmitting device. In an embodiment, different RLC layers (431-433) can map to different MAC layers (441-433). In an embodiment, each RLC sub-flow (431-433) can map to multiple MAC layers (441-433). In an embodiment, multiple RLC layers (431-433) can map to a single MAC layer (431-433). The processed PDUs from each RLC layer (431-433) includes the header indicates the RLC layers (431-433) from which the PDUs (410) is processed. The processed PDUs from each MAC layer (441-443) includes the MAC sub-header indicates the corresponding MAC layer (441-443) from which the PDUs (410) are processed. The MAC layers (441-443) further process the processed PDUs into the single TB. Further, the MAC layers (441-443) send the single TB to the receiving device through the physical layer (450) of the transmitting device. The MAC layers (441-443) includes their own scheduler for managing same LCP for all RLC sub Data Radio Bearer (DRB) entities.

Figure 5B:
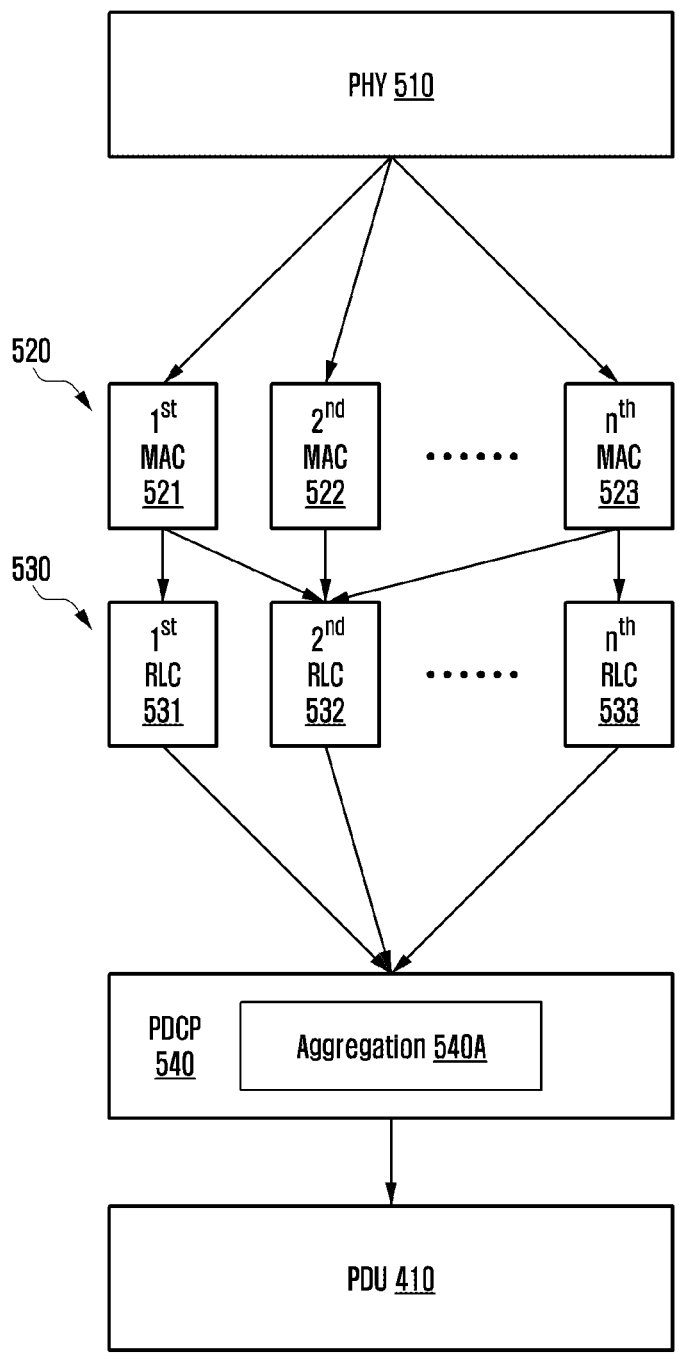
FIG. 5B is a diagram illustrating example data processing in the receiving device by dividing the RLC layer and the MAC layer, according to various embodiments.

FIG. 5B is a diagram illustrating example data processing in the receiving device by dividing the RLC layer (530) and the MAC layer (520), according to various embodiments. Consider the example scenario where the UE (100) is the transmitting device, and the network entity (200) is the receiving device. The layer controller (210) divides the RLC layer (530) into multiple RLC layers e.g., $1^{st}$ RLC (531) to $n^{th}$ RLC (533), where n=2, 3, etc. Further, the layer controller (210) divides the MAC layer (520) into multiple MAC layers e.g., $1^{st}$ MAC (521) to $n^{th}$ RLC (523), where n=2, 3, etc. The MAC layers (521, 522, 523 which may be referred to as 521-523) receive the TB from the transmitting device through the physical layer (510) of the receiving device. Further, the MAC layers (521-523) demultiplex (520A) the TB to the processed PDUs according to the MAC sub-header in each processed PDU. In response to obtaining the processed PDUs, the layer controller (210) distributes the processed PDUs from the MAC layers (521-523) to corresponding RLC layers (531-533) by parsing the MAC sub-headers of each processed PDU.

In an embodiment, different MAC layers (521-523) can map to different RLC layers (531-533). In an embodiment, each MAC layer (521-523) can map to the multiple RLC layers (531-533). In an embodiment, multiple MAC layers (521-523) can map to a single RLC layer (531-533). Each RLC layers (531-533) processes the PDUs received from the MAC layers (521-523) independently and delivers packets to the PDCP layer (540). In response to receiving the processed PDUs at the PDCP layer (540), the layer controller (210) parallelly aggregates (540A) the processed PDUs for generating the PDUs (410).

Figure 6A:
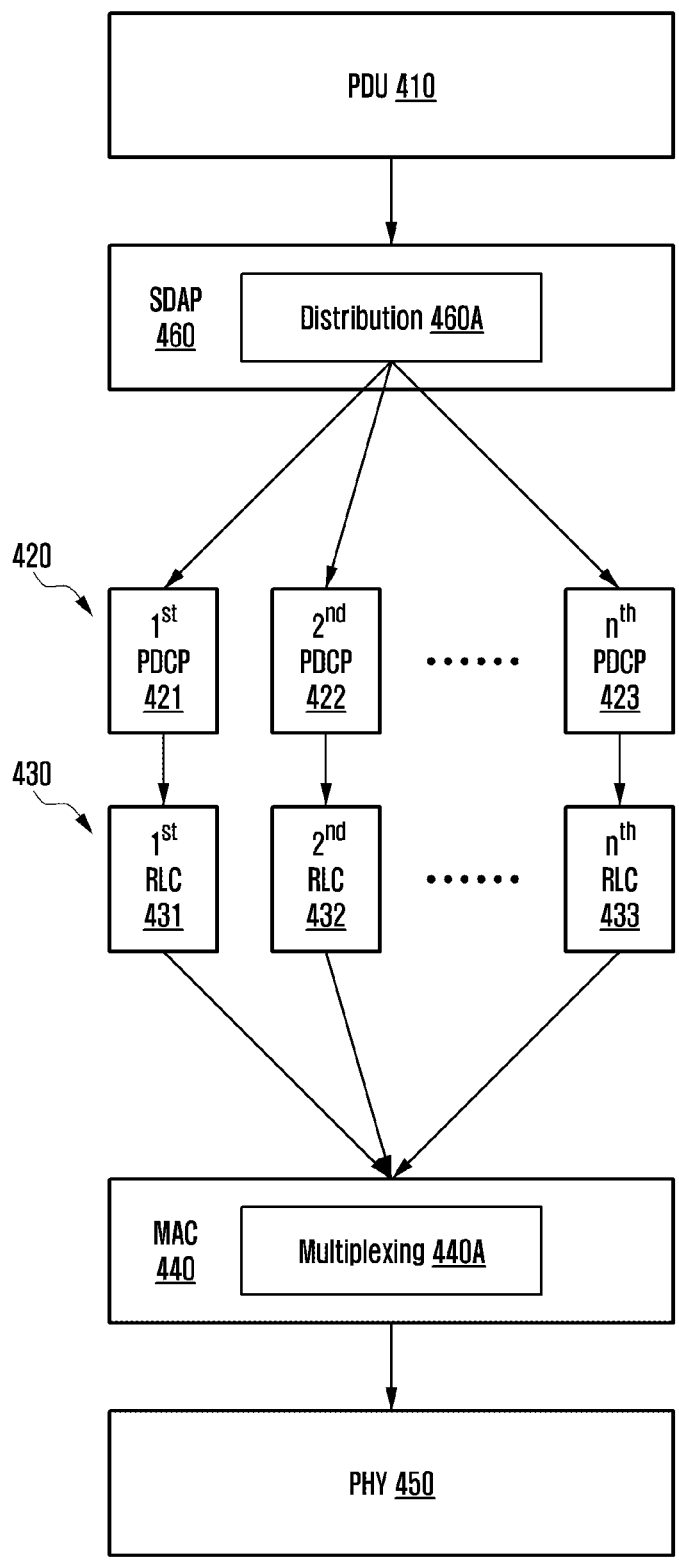
FIG. 6A is a diagram illustrating example data processing in the transmitting device by dividing the RLC layer and a PDCP layer, according to various embodiments.

FIG. 6A is a diagram illustrating example data processing in the transmitting device by dividing the RLC layer (430) and the PDCP layer (420), according to various embodiments. Consider the example scenario where the UE (100) needs to send the PDUs (410) to the network entity (200). Then the UE (100) is the transmitting device, and the network entity (200) is the receiving device in the example scenario. In an embodiment, the transmitting device includes a Service Data Adaptation Protocol (SDAP) layer (460), the PDCP layer (420), the RLC layer (430), the MAC layer (440), and the physical layer (450). The layer controller (110) divides the PDCP layer (420) into multiple PDCP layers e.g., $1^{st}$ PDCP (421) to $n^{th}$ PDCP (423), where n=2, 3, etc. Further, the layer controller (110) divides the RLC layer (430) into the multiple RLC layers e.g., $1^{st}$ RLC (431) to $n^{th}$ RLC (433), where n=2, 3, etc.

In response to receiving the PDUs (410) at the SDAP layer (460), the layer controller (110) distributes (460A) the PDUs (410) from the SDAP layer (460) to the multiple PDCP layers (421-423) for parallelly and independently processing the PDUs (410) at the multiple PDCP layers (421-423). In an embodiment, the PDUs (410) are distributed based on at least one of the sequence (e.g. round robin manner), the random method, the batch/block method, the load (e.g. buffer occupancy) on each PDCP layers (421-423), the processing capability (e.g. maximum idle time) of each PDCP layers (421-423), and the heuristic based method. The layer controller (110) assigns an SDAP Sequence Number (SN) to each processed PDU (410) from the SDAP layer (460) to keep an order for sending the processed PDUs (410) to the PDCP layer (421-423).

In response to processing the PDUs (410), each PDCP layer (421-423) sends the processed PDUs to corresponding RLC layer (431-433) of the transmitting device. Further, the RLC layers (431-433) process the received PDUs and adds the header indicates the RLC layers (431-433) from which the PDUs (410) is processed. In order to distribute the processed PDUs from the SDAP layer (460) to the various sub-flows includes the PDCP layer (421-423) and the RLC layer (431-433), the layer controller (110) maps between Internet Engineering Task Force (IETF) TCP and 3GPP SDAP module for a sub-flow identification to classify certain sets of packets to different sub-flows. The distribution of the processed PDUs is to be done at the SDAP layer, which does not have any packet order related information. There has to be an identifier typically from one of IP/TCP header fields which would help to identify the SDAP layer to distribute the flow into various sub-flows. In response to processing the PDUs (410), the multiple RLC layers send the processed PDUs to the MAC layer (440) of the transmitting device. The MAC layer (440) multiplexes (440A) the processed PDUs into the single TB. In an embodiment, the MAC layer (440) assigns the sub-flow ID in the MAC sub-header for the processed PDU from the multiple RLC layers (431-433). Further, the MAC layer (440) sends the single TB to the receiving device through the physical layer (450) of the transmitting device.

Figure 6B:
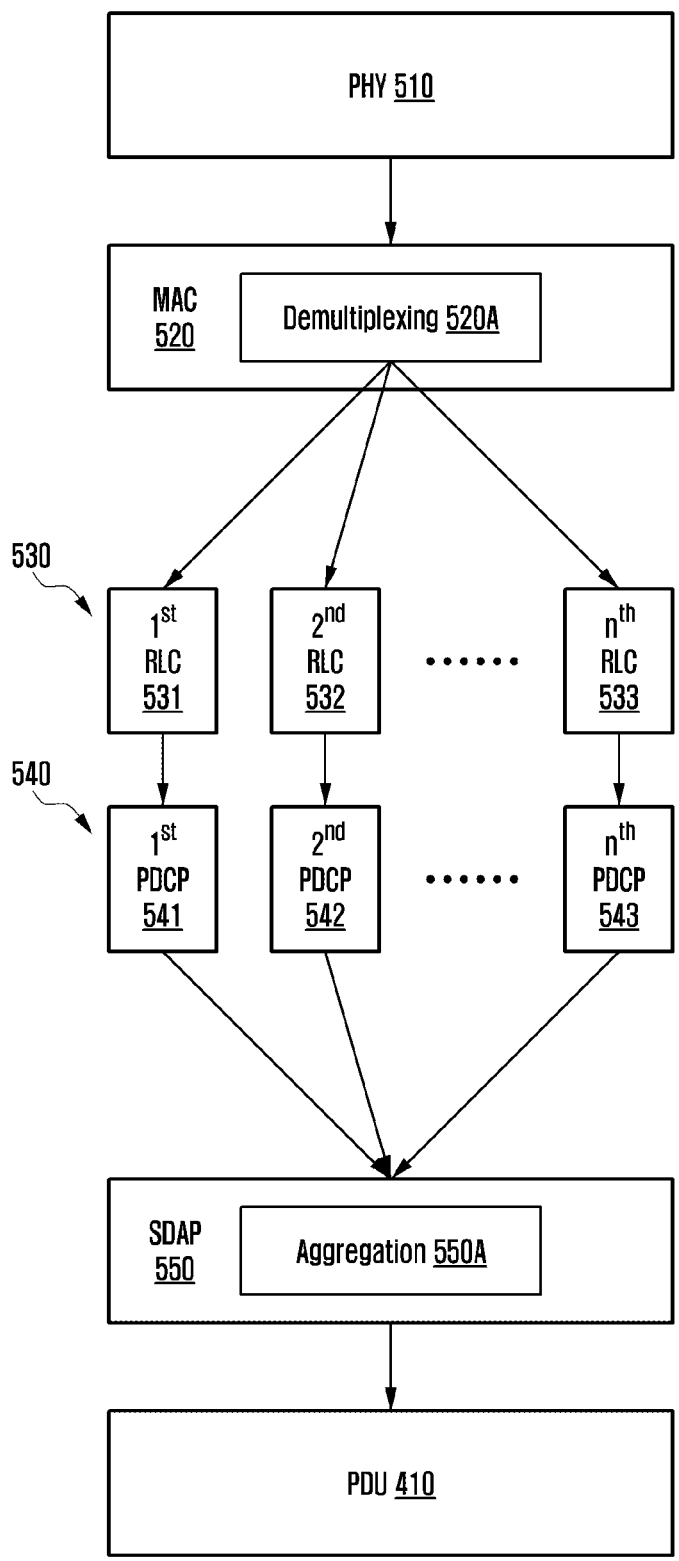
FIG. 6B is a diagram illustrating example data processing in the receiving device by dividing the RLC layer and the PDCP layer, according to various embodiments.

FIG. 6B is a diagram illustrating example data processing in the receiving device by dividing the RLC layer (530) and the PDCP layer (540), according to various embodiments. Consider the example scenario where the UE (100) is the transmitting device, and the network entity (200) is the receiving device. In an embodiment, the receiving device includes the SDAP layer (550), the PDCP layer (540), the RLC layer (530), the MAC layer (520), and the physical layer (510). The layer controller (210) divides the PDCP layer (540) into multiple PDCP layers e.g., $1^{st}$ PDCP (541) to $n^{th}$ PDCP (543), where n=2, 3, etc. Further, the layer controller (210) divides the RLC layer (530) into the multiple RLC layers e.g., $1^{st}$ RLC (531) to $n^{th}$ RLC (533), where n=2, 3, etc. The MAC layer (520) receives the TB from the transmitting device through the physical layer (510) of the receiving device.

Further, the MAC layer (520) demultiplexes (520A) the TB to the processed PDUs according to the MAC sub-header in each processed PDU. In response to obtaining the processed PDUs, the layer controller (210) distributes the processed PDUs from the MAC layer (520) to corresponding RLC layers (531-533) by parsing the MAC sub-headers of each processed PDU. Each RLC layer (531-533) processes the PDUs received from the MAC layer (520) independently and delivers packets to the corresponding PDCP layer (541-543). Further, each PDCP layer (541-543) processes the PDUs received from the corresponding RLC layer (531-533) independently and delivers packets to the SDAP layer (550). In response to receiving the processed PDUs at the SDAP layer (550), the layer controller (210) parallelly aggregates (550A) the processed PDUs for generating the PDUs (410). The layer controller (210) parallelly aggregates (540A) the processed PDUs in the same order at which the PDUs (410) are processed at the SDAP layer (460) of the transmitting device.

Figure 7A:
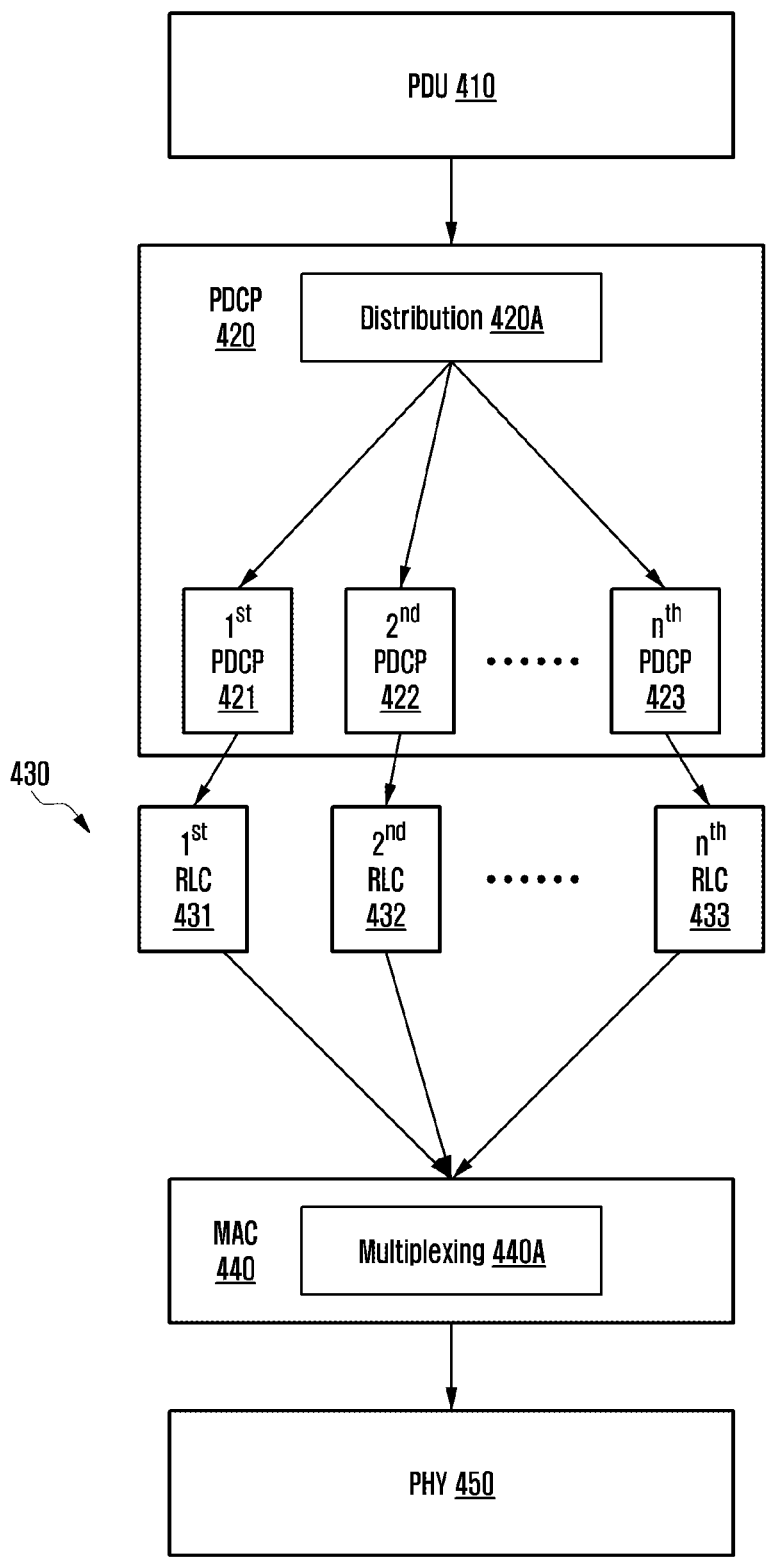
FIG. 7A is a diagram illustrating example data processing in the transmitting device by dividing the RLC layer and a PDCP layer, according to various embodiments.

FIG. 7A is a diagram illustrating example data processing in the transmitting device by dividing the RLC layer (431) and the PDCP layer (421), according to various embodiments. Consider the example scenario where the UE (100) needs to send the PDUs (410) to the network entity (200). Then the UE (100) is the transmitting device, and the network entity (200) is the receiving device in the example scenario. In an embodiment, the transmitting device includes the PDCP layer (420), the RLC layer (430), the MAC layer (440), and the physical layer (450). The layer controller (110) divides the PDCP layer (420) into multiple PDCP layers e.g., $1^{st}$ PDCP (421) to $n^{th}$ PDCP (423), where n=2, 3, etc. Further, the layer controller (110) divides the RLC layer (430) into the multiple RLC layers e.g., $1^{st}$ RLC (431) to $n^{th}$ RLC (433), where n=2, 3, etc.

In response to receiving and processing the PDUs (410) at the PDCP layer (420), the layer controller (110) distributes (420A) the PDUs (410) to the multiple PDCP layers (421-423) for parallelly and independently processing the PDUs (410) at the multiple PDCP layers (421-423). In an embodiment, the PDUs (410) are distributed based on at least one of the sequence (e.g. round robin manner), the random method, the batch/block method, the load (e.g. buffer occupancy) on each PDCP layers (421-423), the processing capability (e.g. maximum idle time) of the each PDCP layers (421-423), and the heuristic based method. In response to processing the PDUs (410), each PDCP layer (421-423) sends the processed PDUs to corresponding RLC layer (431-433) of the transmitting device. In an embodiment, the layer controller (110) assigns a PDCP SN to each processed PDU (410) from the each PDCP layers (421-423) to keep an order for sending the processed PDUs (410) to the RLC layer (431-433).

Further, the RLC layers (431-433) process the received PDUs and adds the header indicates the RLC layers (431-433) from which the PDUs (410) is processed. In response to processing the PDUs (410), the multiple RLC layers send the processed PDUs to the MAC layer (440) of the transmitting device. The MAC layer (440) multiplexes (440A) the processed PDUs into the single TB. The MAC layer (440) assigns the sub-flow ID in the MAC sub-header for the processed PDU from the multiple RLC layers (431-433). Further, the MAC layer (440) sends the single TB to the receiving device through the physical layer (450) of the transmitting device.

Figure 7B:
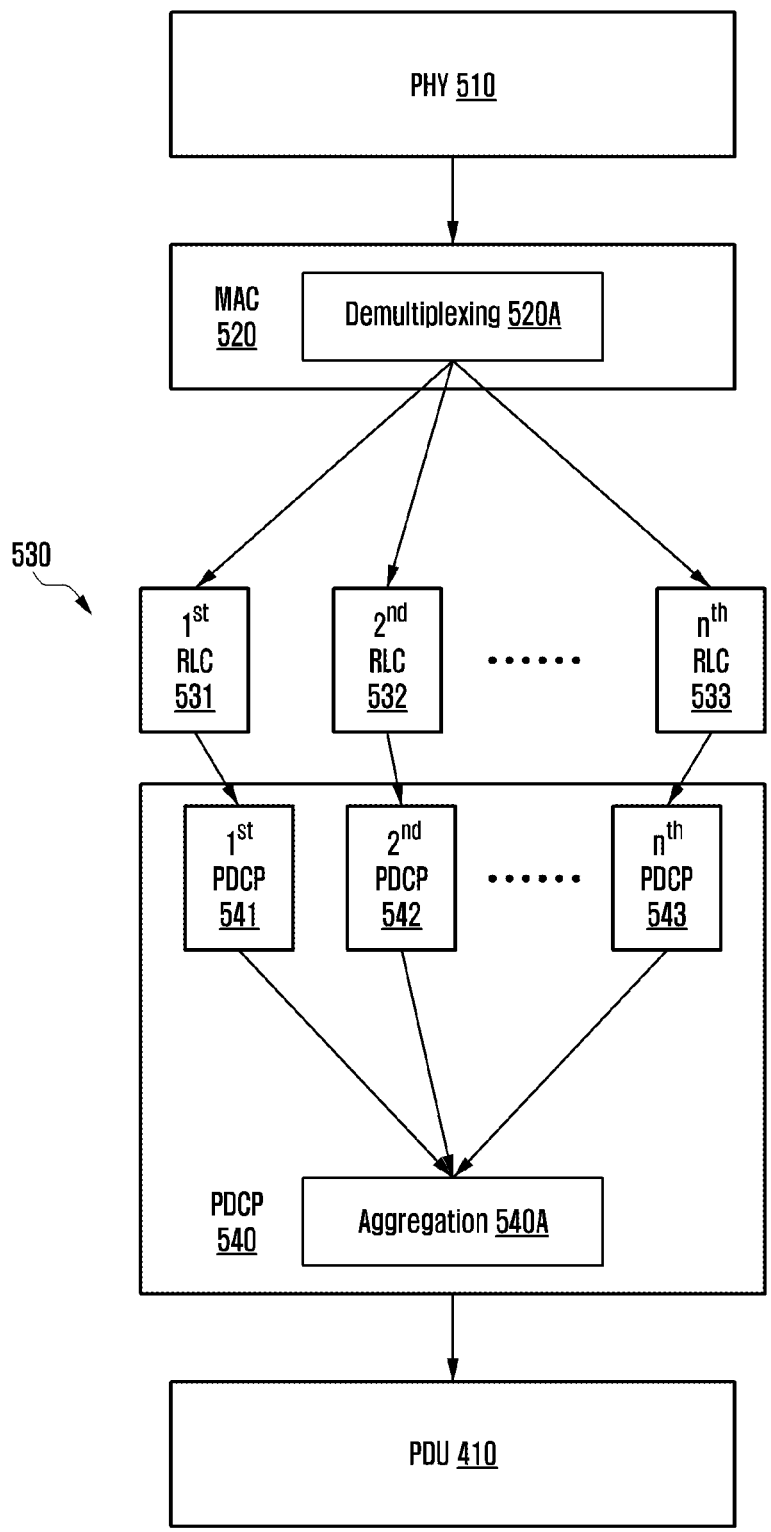
FIG. 7B is a diagram illustrating example data processing in the receiving device by dividing the RLC layer and the PDCP layer, according to various embodiments.

FIG. 7B is a diagram illustrating example data processing in the receiving device by dividing the RLC layer (530) and the PDCP layer (540), according various embodiments.

Consider the example scenario where the UE (100) is the transmitting device, and the network entity (200) is the receiving device. In an embodiment, the receiving device includes the SDAP layer (550), the PDCP layer (540), the RLC layer (530), the MAC layer (520), and the physical layer (510). The layer controller (210) divides the PDCP layer (540) into multiple PDCP layers e.g., $1^{st}$ PDCP (541) to $n^{th}$ PDCP (543), where n=2, 3, etc. Further, the layer controller (210) divides the RLC layer (530) into the multiple RLC layers e.g., $1^{st}$ RLC (531) to $n^{th}$ RLC (533), where n=2, 3, etc. The MAC layer (520) receives the TB from the transmitting device through the physical layer (510) of the receiving device. Further, the MAC layer (520) demultiplexes (520A) the TB to the processed PDUs according to the MAC sub-header in each processed PDU. In response to obtaining the processed PDUs, the layer controller (210) distributes the processed PDUs from the MAC layer (520) to corresponding RLC layers (531-533) by parsing the MAC sub-headers of each processed PDU. Each RLC layer (531-533) processes the PDUs received from the MAC layer (520) independently and delivers packets to the corresponding PDCP layer (541-543). Further, each PDCP layer (541-543) processes the PDUs received from the corresponding RLC layer (531-533) independently. Further, the layer controller (210) parallelly aggregates (540A) the processed PDUs for generating the PDUs (410) in the same order at which the PDUs (410) are processed at the PDCP layers (421-423). In an embodiment, a global SN is required to maintain the ordered packet flow for aggregating the processed PDUs. Since the distribution of the packets is happening before the PDCP processing implies the SN is yet to be assigned, there needs to be one more classifier which is required to identify the packet in order to correctly aggregate the packets received from multiple PDCP sub-flows and still deliver the packets to application in order.

Figure 8A:
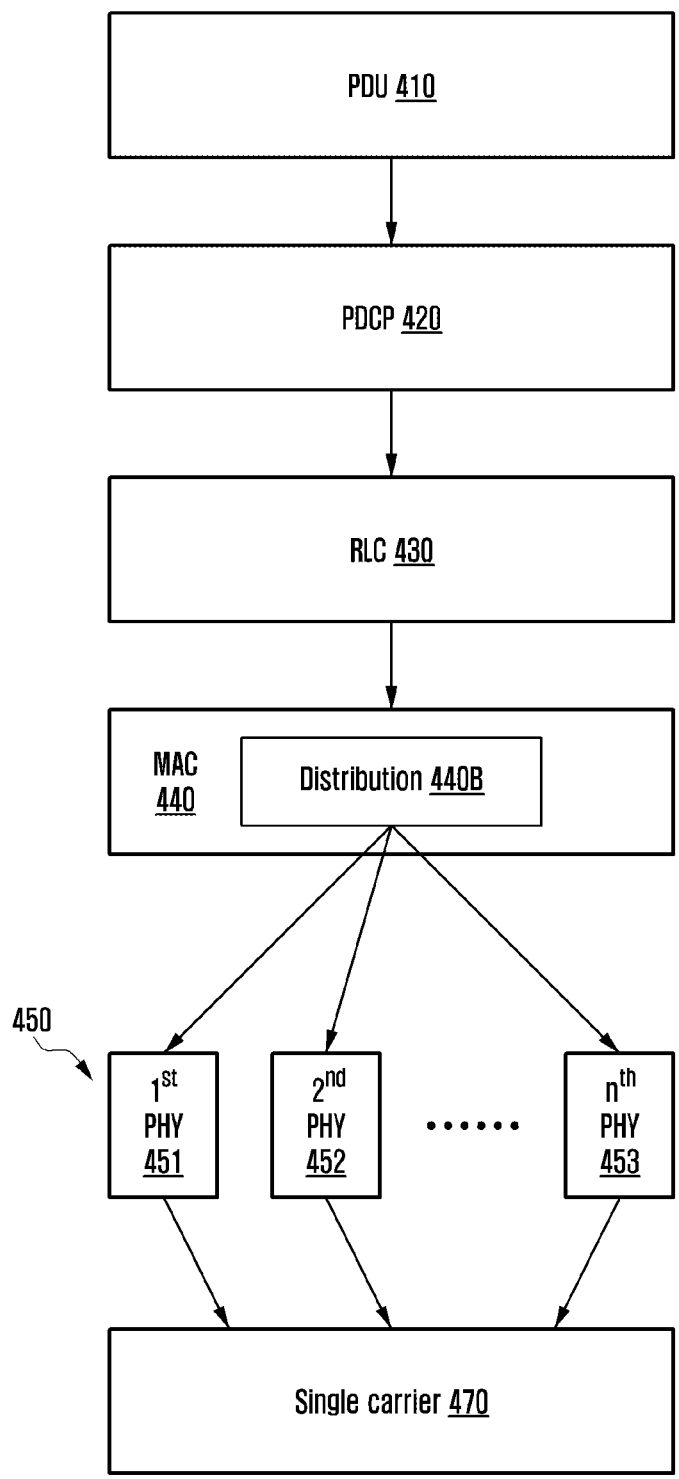
FIG. 8A is a diagram illustrating example data processing in the transmitting device by dividing a physical layer, according to various embodiments.

FIG. 8A is a diagram illustrating example data processing in the transmitting device by dividing the physical layer (450), according to various embodiments. Consider an example scenario where the UE (100) needs to send the PDUs (410) to the network entity (200). Then the UE (100) is the transmitting device, and the network entity (200) is the receiving device in the example scenario. The transmitting device includes the PDCP layer (420), the RLC layer (430), the MAC layer (440), and the physical layer (450). The layer controller (110) divides the physical layer (450) into multiple physical layers e.g., $1^{st}$ PHY (451) to $n^{th}$ PHY (453), where n=2, 3, etc.

In response to receiving and processing the PDUs (410), the PDCP layer (420) sends the PDUs (410) to the RLC layer (430). The RLC layer (430) processes the packets received from the PDCP layer (420) and sends the processed PDUs to the MAC layer (440). Further, the MAC layer (440) generates the TB using the processed PDUs. Further, the layer controller (110) distributes (440B) the TB across the physical layers (451-453) for parallelly and independently sending the TB through the single carrier (470), where the UE (100) is served with multiple TRPs (Transmission and Reception Points) or with single TRP, where each PHY can be considered as a combination of one or more TRPs. The MAC layer (440) assigns the sub-flow ID in the MAC sub-header for the processed PDU from the multiple RLC layers (431-433). In an embodiment, the processed PDUs are distributed based on at least one of the sequence (e.g. round robin manner), the random method, the batch/block method, a load (e.g. buffer occupancy) on each physical layer (451-453), a processing capability (e.g. maximum idle time) of each physical layer (451-453), and the heuristic based method. In an embodiment, timers and parameters are configured independently to use in physical layer (451-453) for parallelly and independently sending the TB. In order to send the TB through a specific physical layer (451-453), the layer controller (110) maps the SDAP layer (550), the PDCP layer (540), the RLC layer (530), the MAC layer (520) to the specific physical layer (451-453).

In an embodiment, when the multiple physical layers (451-453) have been served through the single TRP, then the UE (100) receives multiple grants from the wireless network to send the data to the wireless network in a single Transmission Time Interval (TTI) for each physical layer (451-453). In an embodiment, a Physical Downlink Control Channel (PDCCH) or any other control channel provides indication of the multiple grants to the UE (100). The MAC layer (440) processes the grants simultaneously or parallelly, and form multiple TBs. The encoding and processing of these separate MAC TB may happen in parallel at the physical layer. In an embodiment, the multiple physical layers (451-453) concatenates the multiple TBs from different or same MAC layer (440), form a single physical layer data block, and send the single physical layer data block to the wireless network. When the UE (100) is receiving a single grant from the wireless network to send the data to the wireless network, then the layer controller (110) duplicates the same packet across multiple physical layers (451-453).

Figure 8B:
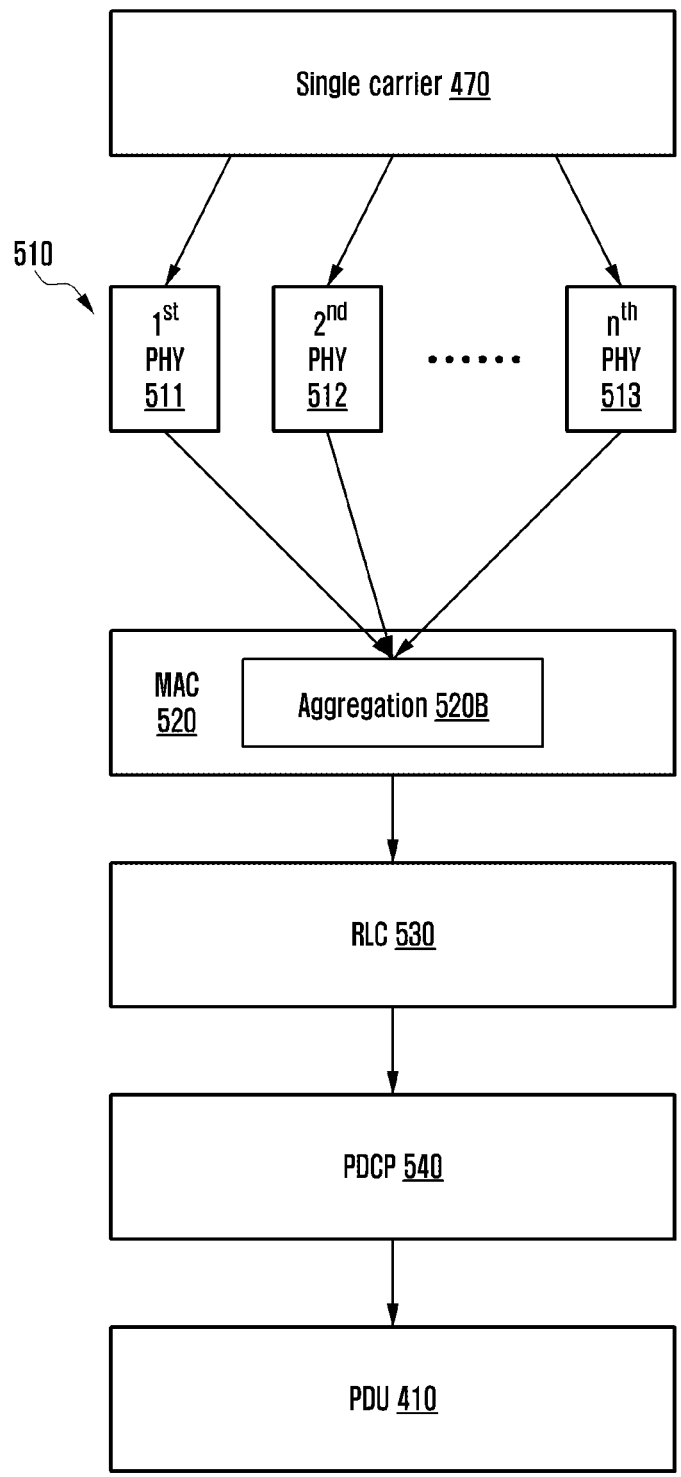
FIG. 8B is a diagram illustrating example data processing in the receiving device by dividing the physical layer, according to various embodiments.

FIG. 8B is a diagram illustrating example data processing in the receiving device by dividing the physical layer (510), according to various embodiments. Consider the example scenario where the UE (100) is the transmitting device, and the network entity (200) is the receiving device. The receiving device includes the PDCP layer (540), the RLC layer (530), the MAC layer (520), and the physical layer (510). The layer controller (210) divides the physical layer (510) into multiple physical layers e.g., 1st PHY (511) to nth PHY (513), where n=2, 3, etc.

The MAC layer (520) receives the TB from the transmitting device through the multiple physical layers (511-513) of the receiving device. Further, the layer controller (210) aggregates (520B) the TB received at the MAC layer (520) from the multiple physical layers (511-513) for generating the processed PDUs. In response to generating the processed PDUs, the MAC layer (520) sends the processed PDUs from the MAC layer (520) to the RLC layer (531-533) by parsing the MAC sub-header of the processed PDU. The RLC layer (530) processes the PDUs received from the MAC layer (520) and delivers packets to the PDCP layer (540). In response to receiving the processed PDUs, the PDCP layer (540) generates the PDUs (410) using the processed PDUs.

Figure 9A:
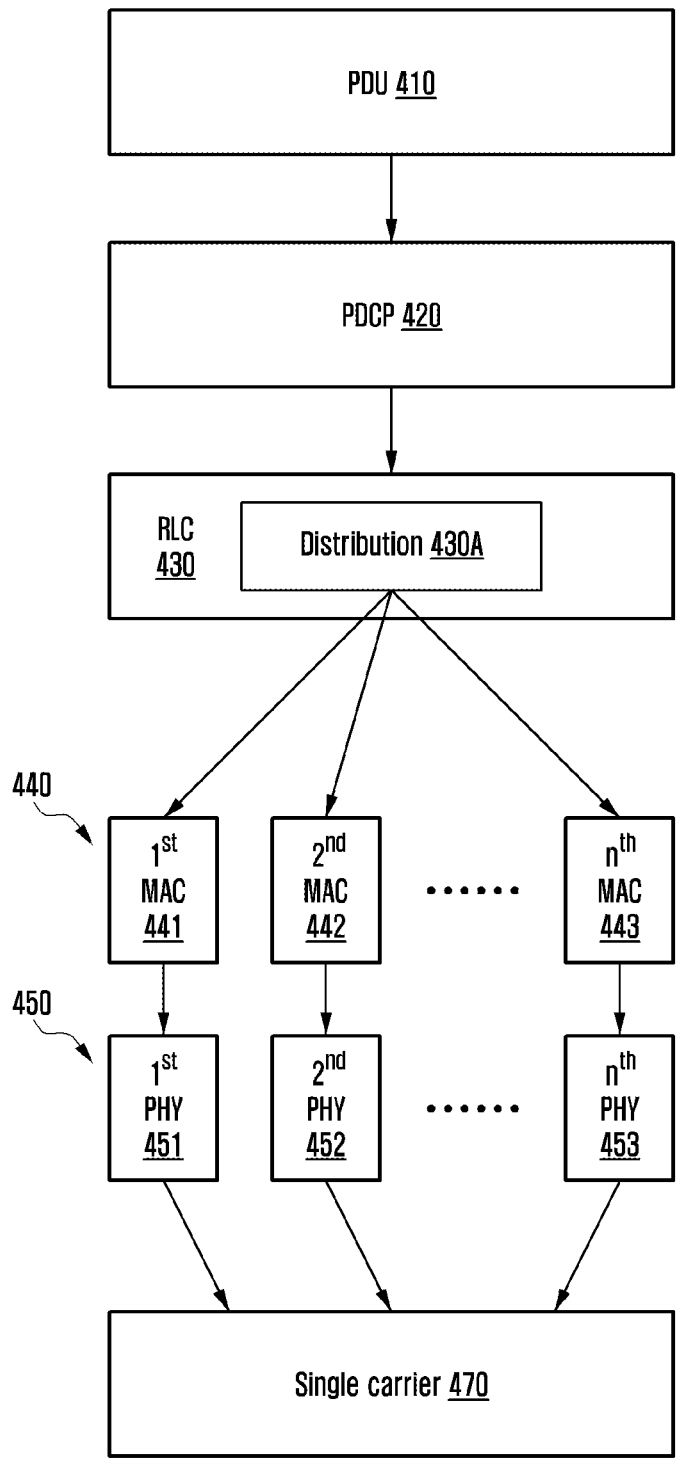
FIG. 9A is a diagram illustrating example data processing in the transmitting device by dividing the MAC layer and the physical layer, according to various embodiments.

FIG. 9A is a diagram illustrating example data processing in the transmitting device by dividing the MAC layer (440) and the physical layer (450), according to various embodiments. Consider an example scenario where the UE (100) needs to send the PDUs (410) to the network entity (200). Then the UE (100) is the transmitting device, and the network entity (200) is the receiving device in the example scenario. The transmitting device includes the PDCP layer (420), the RLC layer (430), the MAC layer (440), and the physical layer (450). The layer controller (110) divides the physical layer (450) into multiple physical layers e.g., $1^{st}$ PHY (451) to $n^{th}$ PHY (453), where n=2, 3, etc. Further, the layer controller (110) divides the MAC layer (440) into multiple MAC layers e.g., $1^{st}$ MAC (441) to $n^{th}$ RLC (433), where n=2, 3, etc.

In response to receiving and processing the PDUs (410), the PDCP layer (420) sends the PDUs (410) to the RLC layer (430). The RLC layer (430) processes the packets received from the PDCP layer (420). Further, the layer controller (110) distributes (430A) the PDUs (410) from the RLC layer (430) to the multiple MAC layers (441-443) for parallelly and independently processing the processed PDUs at the multiple MAC layers (441-443). In an embodiment, the RLC layer (430) can have many sub-flows and further perform one to one mapping or many to one mapping with each MAC layer (441-443). Further, each MAC layer (441-443) generates the TB using the processed PDUs and distributes the TB across corresponding physical layer (451-453) for parallelly and independently sending the TB through the single carrier (470). The MAC layers (441-443) assign the sub-flow ID in the MAC sub-header for the processed PDU from the RLC layer (430). In an embodiment, each MAC layer (441-443) can be mapped independently to each carrier or each physical layer (451-453. In an embodiment, one MAC layer (441-443) or a different MAC layer (441-443) can have common or various MAC functionalities. In an embodiment, the physical layer (451-453) can combine the packet into the single TB if there is only a single carrier is available. In case of multi-Radio Access Technology (multi-RAT) or multi-TRP or multi-carrier, the physical layer (451-453) can process the packets independently.

Figure 9B:
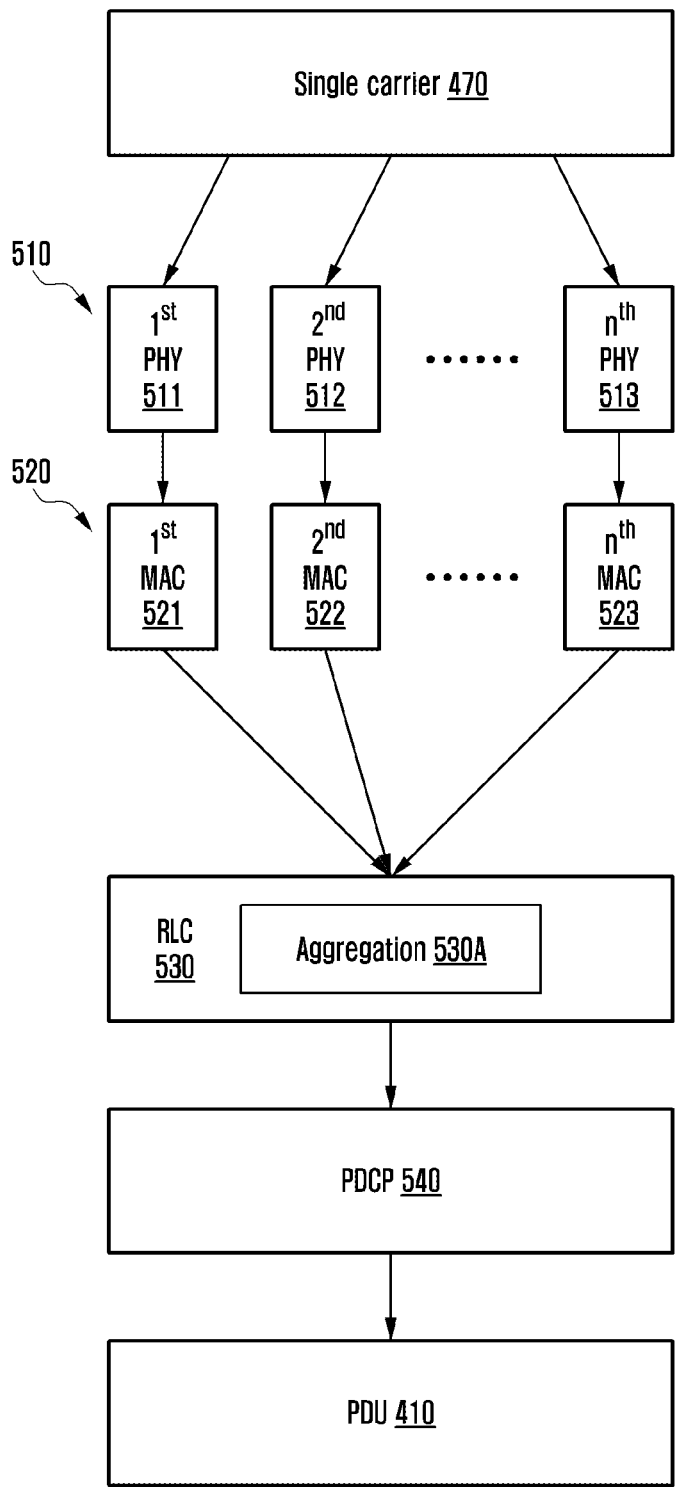
FIG. 9B is a diagram illustrating example data processing in the receiving device by dividing the MAC layer and the physical layer, according to various embodiments.

FIG. 9B is a diagram illustrating example data processing in the receiving device by dividing the MAC layer (520) and the physical layer (510), according to various embodiments. Consider the example scenario where the UE (100) is the transmitting device, and the network entity (200) is the receiving device. The receiving device includes the PDCP layer (540), the RLC layer (530), the MAC layer (520), and the physical layer (510). The layer controller (210) divides the MAC layer (520) into multiple MAC layers e.g., $1^{st}$ MAC (521) to $n^{th}$ RLC (523), where n=2, 3, etc. Further, the layer controller (210) divides the physical layer (510) into multiple physical layers e.g., 1st PHY (511) to nth PHY (513), where n=2, 3, etc.

The multiple MAC layers (521-523) receive the TB from the transmitting device through corresponding physical layer (511-513) of the receiving device. Further, the multiple MAC layers (521-523) generates the processed PDUs from the TB and sends the processed PDUs to the RLC layer (530). Further, the layer controller (210) aggregates (530A) the processed PDUs received from the MAC layers (521-523). Further, the RLC layer (530) sends the processed PDUs to the PDCP layer (540). In response to receiving the processed PDUs, the PDCP layer (540) generates the PDUs (410) using the processed PDUs.

FIG. 10 is a diagram illustrating an example frame format of a MAC sub-transmission block, according to various embodiments. The MAC sub-transmission block is the processed PDU generated by the MAC layer (440) using the PDUs processed by the RLC layers (431-433). A frame of the MAC sub-transmission block starts with the MAC sub-header (601) and further followed by the n number of PDUs processed by the RLC layers (431-433) in sequence, e.g., $1^{st}$ RLC PDU (602) to $n^{th}$ RLC PDU (604). The single MAC sub-header can be used to indicate the RLC PDUs (602, 603, 604 which may be referred to as 602-604) of the same sub-flow.

If the distribution of the PDUs (410) at the PDCP layer (420) is done using the batch/block method (e.g., a batch of sequential PDCP PDUs are mapped to one RLC sub-flow), and the MAC layer (440) concatenates the processed PDUs from the RLC layers (431-433) using the batch/block method (e.g., the processed PDUs from the RLC layers (431-433) of the same sub-flow is concatenated continuously in the TB), then one MAC sub-header is enough for generating a packaged data unit (e.g., MAC sub-transmission block) of one RLC sub-flow.

FIG. 11 is a diagram illustrating an example frame format of a MAC LCID sub-header with a sub-flow ID, according to various embodiments. The frame format of the MAC LCID sub-header with a sub-flow ID includes a Reserved field (R 701), an Extension field (E 702), a Logical Channel ID (LCID 703) the sub-flow ID (704) and length of sub TBs (705, 706, 707 which may be referred to as 705-707). A single LCID can be mapped to multiple sub-flow IDs and hence differentiation is required in order to identify at the MAC layer to define what portion of the entire MAC TB belongs to which sub flow ID. This portion within the MAC TB is termed as sub-TB and hence the length of sub-TB also has to be indicated in the MAC sub-header.

FIG. 12 is a diagram illustrating an example frame format of a 16 bit RLC header with the SN, according to various embodiments. A sample frame format of the 16 bit RLC header with the SN includes a Data/control field (D 801), a Polling bit (P 802), a Segmentation Information (SI 803), a Reserved bit (R), the Sequence Number (SN 805-806), and the length field (807-808).

Existing 3GPP 5G specification does not have the length field information (807-808) present in the RLC header. However, there would be advantage in terms of simplifying processing when the length of the RLC PDU is indicated in the RLC header itself indicated by the length.

In an embodiment, removing the length field from the MAC sub-header for individual RLC PDUs and adding the length field in RLC PDUs cause to optimize the packaged data unit.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A network entity of a wireless network, comprising:
   communication circuitry; and
   a processor comprising processor circuitry,
   wherein the processor is configured to:
   receive, via the communication circuitry, capability information of a user equipment (UE) from the UE,
   determine a number of parallel and independent data processing supported by the UE based on the capability information of the UE,
   divide at least one of a data link layer and a physical layer of the network entity based on the number of parallel and independent data processing supported by the UE for the parallel and independent data processing,
   send, via the communication circuitry, a configuration parameter comprising the number of parallel and independent data processing supported by the UE to the UE, and
   dynamically update a number of divisions of the at least one of the data link layer and/or the physical layer based on a throughput requirement of the UE and/or a performance requirement of the UE while maintaining at least one active data flow.

2. The network entity of claim 1, wherein the processor is further configured to:
   receive, via the communication circuitry, a packet data unit (PDU) processed by the UE; and
   parallelly aggregate the processed PDUs using the at least one of the data link layer and the physical layer of the network entity for generating the plurality of PDUs.

3. The network entity of claim 1, wherein the processor is further configured to:
   receive a plurality of packet data units (PDUs);
   distribute the plurality of PDUs to the at least one of the divided data link layer and the divided physical layer of the network entity for parallelly processing the plurality of PDUs; and
   send, via the communication circuitry, the processed PDUs to the UE.

4. The network entity of claim 1, wherein the capability information of the UE comprises at least one of a number of cores of a processor of the UE available for data processing, a processor frequency, a maximum throughput of the UE, and a throughput requirement of an application of the UE.

5. The network entity of claim 1, wherein the data link layer comprises at least one of a Packet Data Convergence Protocol (PDCP) layer, a Radio Link Control (RLC) layer, and a Media Access Control (MAC) layer.

6. A User Equipment (UE), comprising:
communication circuitry; and
a processor comprising processor circuitry,
wherein the processor is configured to:
   send, via the communication circuitry, capability information of the UE to the network entity,
   receive, via the communication circuitry, a configuration parameter comprising a number of parallel and independent data processing supported by the UE from the network entity,
   divide at least one of data link layer and a physical layer of the UE based on the number of parallel and independent data processing supported by the UE, and
   dynamically update a number of divisions of the at least one of the data link layer and the physical layer based on a throughput requirement of the UE and/or a performance requirement of the UE while maintaining at least one active data flow.

7. The UE of claim 6, wherein the processor is further configured to:
   receive a plurality of Packet Data Units (PDUs);
   distribute the plurality of PDUs to the at least one of the divided data link layer and the divided physical layer of the UE for parallelly processing the plurality of PDUs; and
   send, via the communication circuitry, the processed PDUs to the network entity.

8. The UE of claim 6, wherein the processor is further configured to:
   receive, via the communication circuitry, PDUs processed by the network entity; and
   parallelly aggregate the processed PDUs using the at least one of the data link layer and the physical layer of the UE for generating the plurality of PDUs.

9. The UE of claim 6, wherein the capability information of the UE comprises at least one of a number of cores of a processor of the UE available for data processing, a processor frequency, a maximum throughput of the UE, and a throughput requirement of an application of the UE.

10. The UE of claim 6, wherein the data link layer comprises at least one of a Packet Data Convergence Protocol (PDCP) layer, a Radio Link Control (RLC) layer, and a Media Access Control (MAC) layer.

11. A method for data processing in a wireless network, comprising:
   receiving, by a network entity of the wireless network, capability information of a User Equipment (UE) from the UE;
   determining, by the network entity, a number of parallel and independent data processing supported by the UE based on the capability information of the UE; and
   dividing, by the network entity, at least one of data link layer and a physical layer of the network entity based on the number of parallel and independent data processing supported by the UE for the parallel and independent data processing;
   sending a configuration parameter comprising the number of parallel and independent data processing supported by the UE to the UE; and
   dynamically updating a number of divisions of the at least one of the data link layer and the physical layer based on a throughput requirement of the UE and/or a performance requirement of the UE while maintaining at least one active data flow.

12. The method of claim 11, further comprising:
   receiving a packet data unit (PDU) processed by the UE through the communication circuitry; and
   parallelly aggregating the processed PDUs using the at least one of the data link layer and the physical layer of the network entity for generating the plurality of PDUs.

13. A method for data processing in a User Equipment (UE), comprising:
   sending, by the UE, capability information of the UE to a network entity of a wireless network;
   receiving, by the UE, a configuration parameter comprising a number of parallel and independent data processing supported by the UE from the network entity;
   dividing, by the UE, at least one of a data link layer and a physical layer of the UE based on the number of parallel data processing supported by the UE; and
   dynamically updating a number of divisions of the at least one of the data link layer and the physical layer based on a throughput requirement of the UE and/or a performance requirement of the UE while maintaining at least one active data flow.

14. The method of claim 13, further comprising:
   receiving a plurality of Packet Data Units (PDUs);
   distributing the plurality of PDUs to the at least one of the divided data link layer or the divided physical layer of the UE for parallelly processing the plurality of PDUs; and
   sending the processed PDUs to the network entity.

15. The method of claim 13, further comprising:
   receiving PDUs processed by the network entity; and
   parallelly aggregating the processed PDUs using the at least one of the data link layer and the physical layer of the UE for generating the plurality of PDUs.

16. The method of claim 13, wherein the capability information of the UE comprises at least one of a number of cores of a processor of the UE available for data processing, a processor frequency, a maximum throughput of the UE, and a throughput requirement of an application of the UE.

* * * * *